(12) United States Patent
Vadlejch et al.

(10) Patent No.: US 11,383,824 B2
(45) Date of Patent: Jul. 12, 2022

(54) ACTUATOR SYSTEMS AND METHODS FOR FLIGHT CONTROL SURFACE

(71) Applicant: HONEYWELL INTERNATIONAL INC., Morris Plains, NJ (US)

(72) Inventors: Filip Vadlejch, Brno (CZ); Antonin Skarolek, Brno (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 366 days.

(21) Appl. No.: 16/419,310

(22) Filed: May 22, 2019

(65) Prior Publication Data

US 2020/0369373 A1 Nov. 26, 2020

(51) Int. Cl.
*B64C 13/34* (2006.01)
*B64C 13/50* (2006.01)
*B64C 13/28* (2006.01)

(52) U.S. Cl.
CPC ............ *B64C 13/34* (2013.01); *B64C 13/505* (2018.01); *B64C 13/341* (2018.01)

(58) Field of Classification Search
CPC ...................................................... B64C 13/34
See application file for complete search history.

(56) References Cited

U.S. PATENT DOCUMENTS

| 3,679,956 | A | 7/1972 | Redmond |
| 4,834,319 | A | 5/1989 | Ewy et al. |
| 2011/0041632 | A1 | 2/2011 | Baker et al. |
| 2015/0076282 | A1 | 3/2015 | Hauber |

FOREIGN PATENT DOCUMENTS

| CA | 745788 A | 11/1966 |
| FR | 2562028 A1 | 10/1985 |
| GB | 629726 A | 9/1949 |

*Primary Examiner* — Erin D Bishop
(74) *Attorney, Agent, or Firm* — Lorenz & Kopf, LLP

(57) ABSTRACT

An actuator system for a flight control surface of an aerial vehicle includes a differential gear set having a first sun gear, a second sun gear and at least one planet gear to directly drive the flight control surface. The actuator system includes a first electric servomotor coupled to the aerial vehicle, and the first electric servomotor drives the first sun gear to drive the at least one planet gear. The actuator system includes a second electric servomotor coupled to the aerial vehicle, and the second electric servomotor drives the second sun gear to drive the at least one planet gear such that the first electric servomotor and the second electric servomotor cooperate to rotate the flight control surface relative to the aerial vehicle by producing a single rotary output.

17 Claims, 8 Drawing Sheets

ACTUATOR SYSTEMS AND METHODS FOR FLIGHT CONTROL SURFACE

TECHNICAL FIELD

The present disclosure generally relates to vehicles, such as aerial vehicles, and more particularly relates to actuator systems and methods for moving a flight control surface of an aerial vehicle.

BACKGROUND

Certain aerial vehicles, such as aircraft, generally have one or more surfaces that are movable to control a flight of the aerial vehicle. Typically, one or more hydraulic actuators are employed to move the surface. The use of the hydraulic actuators, however, require the use of hydraulic pumps, hoses, valves and other hydraulic components to supply fluid to the hydraulic actuators to enable the movement of the surface. The numerous components associated with the hydraulic actuators increase a weight associated with the aerial vehicle, which is undesirable. In addition, due to the number of components involved, maintenance of the hydraulic actuators and the hydraulic components may be time consuming and complex.

Accordingly, it is desirable to provide actuators system and methods for moving a flight control surface of an aerial vehicle, which has a reduced weight. In addition, it is desirable to provide an actuator system for a flight control surface that has a reduced number of components, which may reduce maintenance time and complexity. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is an actuator system for a flight control surface of an aerial vehicle. The actuator system includes a differential gear set having a first sun gear, a second sun gear and at least one planet gear to directly drive the flight control surface. The actuator system includes a first electric servomotor coupled to the aerial vehicle, and the first electric servomotor drives the first sun gear to drive the at least one planet gear. The actuator system includes a second electric servomotor coupled to the aerial vehicle, and the second electric servomotor drives the second sun gear to drive the at least one planet gear such that the first electric servomotor and the second electric servomotor cooperate to rotate the flight control surface relative to the aerial vehicle by producing a single rotary output.

The actuator system further comprises a first speed reduction gear set driven by the first electric servomotor and the first speed reduction gear set drives the first sun gear, and a second speed reduction gear set driven by the second electric servomotor and the second speed reduction gear set drives the second sun gear. The the first electric servomotor and the second electric servomotor rotate in the same direction to drive the first sun gear and the second sun gear, respectively, to drive the at least one planet gear. The single rotary output is equal to a velocity sum of the first electric servomotor and the second electric servomotor. The flight control surface has an axis of rotation and the first electric servomotor and the second electric servomotor are coupled to the aerial vehicle so as to be coaxial with the axis of rotation. The first sun gear and the second sun gear are coupled to the first electric servomotor and the second electric servomotor, respectively, so as to be coaxial with the axis of rotation, and the at least one planet gear has a second axis of rotation that is transverse to the axis of rotation of the flight control surface. The aerial vehicle includes a frame and the first electric servomotor and the second electric servomotor are coupled to the frame by respective mounting brackets, and the first electric servomotor and the second electric servomotor are spaced apart along a longitudinal axis defined by the actuator system. The actuator system further comprises a flange coupled to the flight control surface, the flange including at least one receptacle for receiving a portion of the at least one planet gear to couple the at least one planet gear to the flight control surface. The frame of the aerial vehicle defines a cavity, and at least the first electric servomotor and the second electric servomotor are received within the cavity.

Also provided according to various embodiments is an aircraft. The aircraft includes a flight control surface having an axis of rotation and an actuator system for moving the flight control surface relative to the aircraft. The actuator system includes a differential gear set having a first sun gear, a second sun gear and at least one planet gear to drive the flight control surface. The actuator system includes a first motor coaxial with the axis of rotation, and the first motor drives the first sun gear to drive the at least one planet gear. The actuator system includes a second motor coaxial with the axis of rotation, and the second motor drives the second sun gear to drive the at least one planet gear such that the first motor and the second motor cooperate to rotate the flight control surface relative to the aircraft.

The actuator system further comprises a first speed reduction gear set driven by the first motor and the first speed reduction gear set drives the first sun gear, and a second speed reduction gear set driven by the second motor and the second speed reduction gear set drives the second sun gear. The first motor and the second motor rotate in the same direction to drive the first sun gear and the second sun gear, respectively, to drive the at least one planet gear. The first sun gear and the second sun gear are coupled to the first motor and the second motor, respectively, so as to be coaxial with the axis of rotation, and the at least one planet gear has a second axis of rotation that is transverse to the axis of rotation of the flight control surface. The aircraft includes a frame and the actuator includes a flange coupled to the frame, and the flange includes at least one receptacle for receiving a portion of the at least one planet gear to couple the at least one planet gear to the frame. The flight control surface includes a first control surface coupled to a second control surface with an interconnecting member to define a cavity, at least the first motor and the second motor are received within the cavity and the first motor and the second motor are each coupled to the interconnecting member with a mounting bracket. The aircraft includes a frame, each of the first motor and the second motor are coupled to the frame by a mounting bracket, and the first motor and the second motor are spaced apart along a longitudinal axis defined by the actuator system. The aircraft further comprises a flange coupled to the flight control surface, the flange including at least one receptacle for receiving a portion of the at least one planet gear to couple the at least one planet gear to the flight control surface. The frame defines a cavity, and at least the first motor and the second motor are received within the cavity.

Further provided is a method of actuating a flight control surface of an aerial vehicle. The method includes receiving, by a processor, a demand for the flight control surface; based on the demand for the flight control surface, outputting one or more control signals, by the processor, to a first electric servomotor to drive a first sun gear to drive at least one planet gear coupled to the flight control surface; and based on the demand for the flight control surface, outputting one or more control signals, by the processor, to a second electric servomotor to drive a second sun gear to drive the at least one planet gear coupled to the flight control surface, the first electric servomotor and the second electric servomotor cooperating to rotate the flight control surface relative to the aerial vehicle.

The receiving, by the processor, the demand for the flight control surface further comprises receiving, by the processor, a position for the flight control surface, and the outputting the one or more control signals, by the processor, is based on the position.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
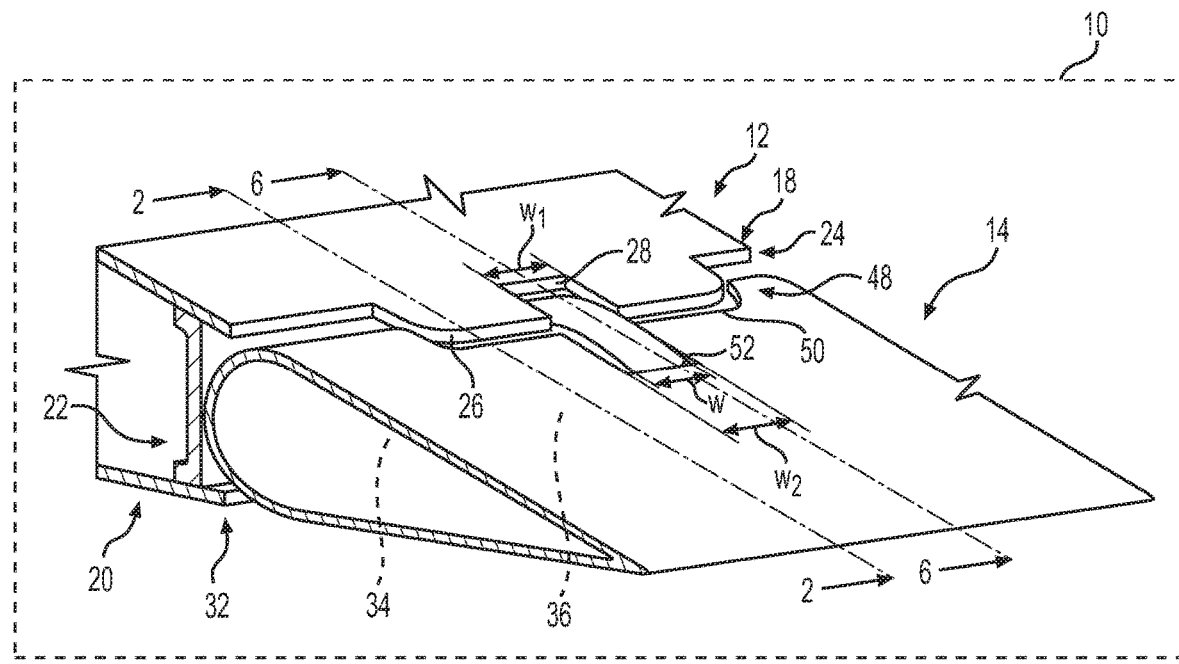
FIG. 1 is a detail schematic illustration of a portion of an aerial vehicle, such as an aircraft, which includes an actuator system for a flight control surface in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of vehicle that would benefit from having a hinge actuator, and the actuator described herein for a primary flight surface of an aircraft is merely one exemplary embodiment according to the present disclosure. In addition, while the actuator is described herein as being used with a surface of a vehicle, such as a bus, motorcycle, train, motor vehicle, marine vessel, aircraft and the like, the various teachings of the present disclosure can be used with a rotatable surface on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel.

With reference to FIG. 1, a detail view of a portion of an aerial vehicle, such as an aircraft 10 is shown. In this example, the aircraft 10 is a fixed-wing aircraft. The aircraft 10 includes a support structure or frame 12 and a primary flight control surface 14. An actuator system 16 is coupled to the frame 12 and the primary flight control surface 14 to move or rotate the primary flight control surface 14 relative to the frame 12. In one example, the primary flight control surface 14 is an aileron, however, the actuator system 16 may be used to move or rotate a rudder, elevator, etc. In addition, the actuator system 16 may be used in conjunction with another actuator system to move or rotate a flap. Moreover, while a single actuator system 16 is shown herein for use with the primary flight control surface 14, any number of actuator systems 16 may be employed depending on the length of the primary flight control surface, for example. In this example, the actuator system 16 is configured to move the primary flight control surface 14 between about positive 90 degrees to about negative 90 degrees relative to the frame 12 about an axis of rotation R (FIG. 2); however, the actuator system 16 may be configured to move the primary flight control surface 14 about any desired range of motion that is typical for the particular primary flight control surface. For example, in certain embodiments, the actuator system 16 may be configured to move the primary flight control surface 14 between about positive 30 degrees and about negative 30 degrees in the instance where the primary flight control surface 14 provides an attitude adjustment for the aircraft 10.

In this example, the frame 12 includes a first frame member 18, a second frame member 20 and a connecting frame member 22. In one example, the frame 12 is a wing beam. The first frame member 18 is generally opposite the second frame member 20, and is spaced apart from the first frame member 18 by the connecting frame member 22. The first frame member 18 has a first end 24, which is adjacent to the primary flight control surface 14. In this example, the first end 24 has a first projection 26, which defines a slot 28. The slot 28 receives a portion of the actuator system 16 for coupling the primary flight control surface 14 to the actuator system 16. The second frame member 20 has a second end 32, which is adjacent to the primary flight control surface 14. The second end 32 has a second projection 34, which defines a second slot 36. The second slot 36 receives a portion of the actuator system 16 for coupling the primary flight control surface 14 to the actuator system 16. Generally, the second end 32 has the same shape as the first end 24 to facilitate the coupling of the primary flight control surface 14 to the actuator system 16.

The connecting frame member 22 is coupled between the first frame member 18 and the second frame member 20 to connect the first frame member 18 to the second frame member 20. In this example, with reference to FIG. 2, the connecting frame member 22 is coupled between the first frame member 18 and the second frame member 20. The first frame member 18, the second frame member 20 and the connecting frame member 22 cooperate to define a cavity 38. The cavity 38 is sized to receive the actuator system 16.

Figure 2:
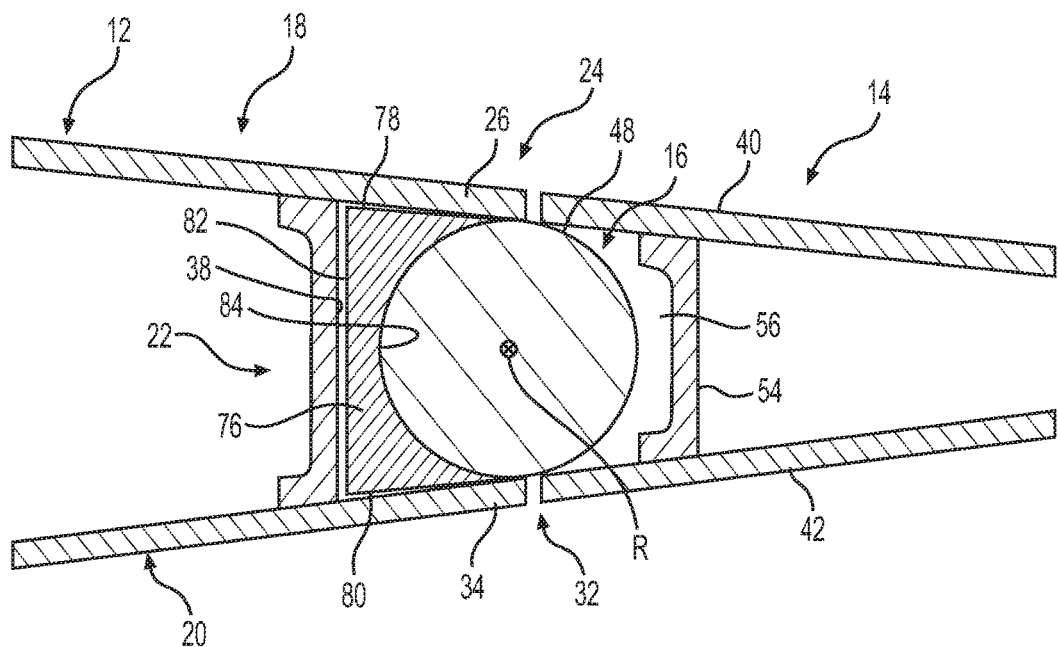
FIG. 2 is a cross-sectional view of the portion of the aerial vehicle, taken along line 2-2, of FIG. 1.

In one example, the primary flight control surface 14 includes a first control surface 40, a second control surface 42, a first control end 44 and a second control end 46. The first control surface 40 is opposite the second control surface 42. The first control end 44 and the second control end 46 interconnect the first control surface 40 and the second control surface 42. The first control surface 40 may be tapered from the first control end 44 to the second control end 46, and the second control surface 42 may be substantially planar from the first control end 44 to the second control end 46. In this example, the first control end 44 defines a recess 48 that extends from the first control surface 40 to the second control surface 42 (FIG. 2). The recess 48 is sized to cooperate with a portion of the actuator system 16. In one example, the recess 48 includes an enlarged opening 50 and a notch 52. The enlarged opening 50 enables the primary flight control surface 14 to move relative to the frame 12 without contacting the frame 12. The notch 52 receives a portion of the actuator system 16 to couple the actuator system 16 to the primary flight control surface 14. With reference to FIG. 2, the primary flight control surface 14 may also include an interconnecting member 54, and the first control surface 40 may be spaced apart from the second control surface 42 by the interconnecting member 54. The interconnecting member 54 may provide support to the first control surface 40 and the second control surface 42. In one example, the actuator system 16 may be coupled to the interconnecting member 54 to couple the actuator system 16 to the primary flight control surface 14. A second cavity 56 is defined by the first control surface 40, the second control surface 42 and the interconnecting member 54.

Figure 3:
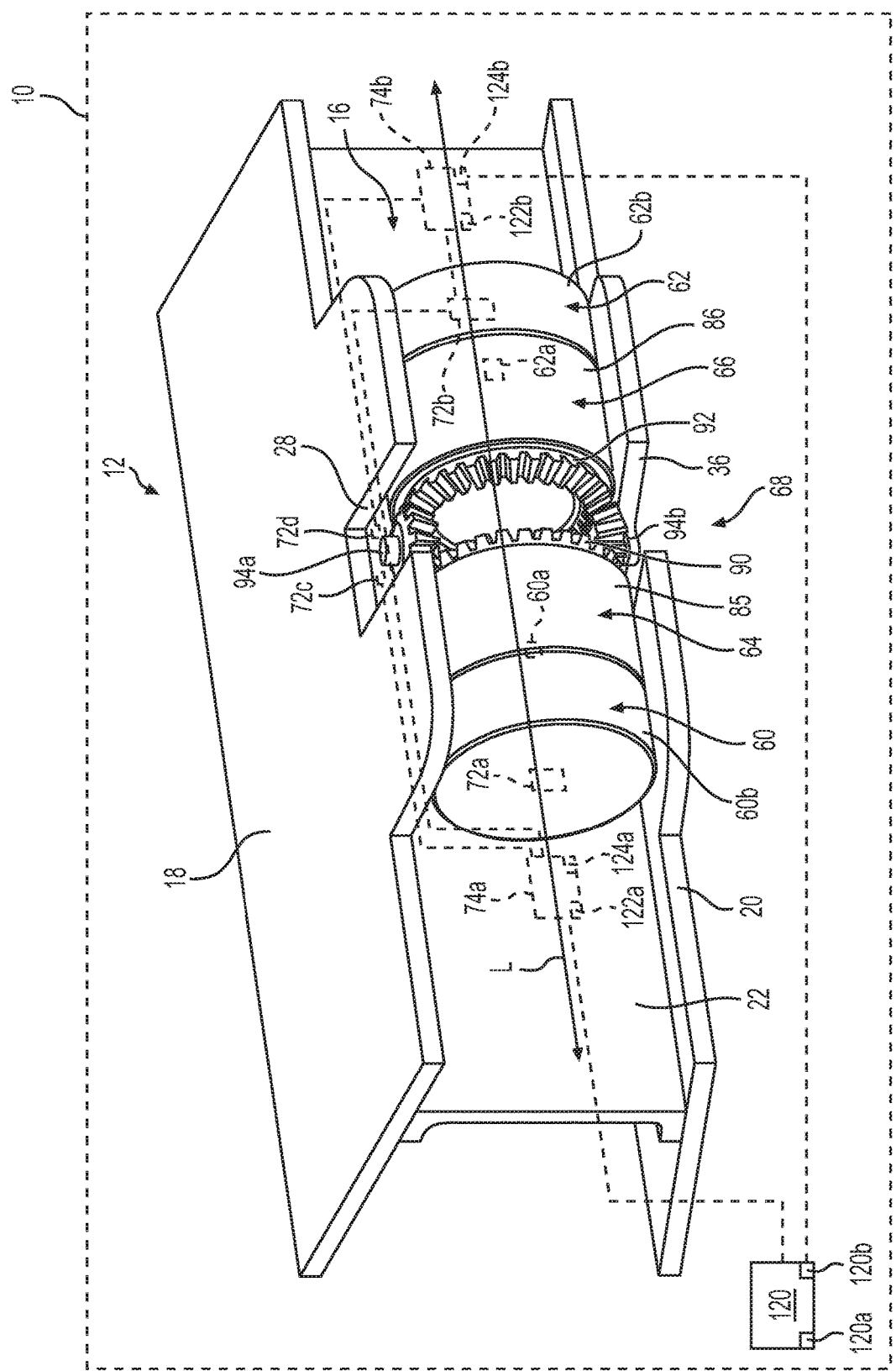
FIG. 3 is a perspective view of the portion of the aerial vehicle of FIG. 1, in which the flight control surface has been removed to illustrate the actuator system coupled to a frame of the vehicle.

The actuator system 16 movably or rotatably couples the primary flight control surface 14 to the frame 12. In one example, with reference to FIG. 3, the actuator system 16 includes a first motor 60, a second motor 62, a first speed reduction gear set 64, a second speed reduction gear set 66, a differential gear set 68, a flange 70 (FIG. 4), one or more sensors 72 and a controller 74. FIG. 3 is a perspective view of the frame 12 and the actuator system 16, in which the primary flight control surface 14 has been removed for clarity. Generally, the first motor 60, the second motor 62, the first speed reduction gear set 64, the second speed reduction gear set 66 and the differential gear set 68 are contained wholly within the cavity 38 and the second cavity 56. In addition, at least the first motor 60, the second motor 62, the first speed reduction gear set 64 and the second speed reduction gear set 66 are coupled to the frame 12 so as to be coaxial with the axis of rotation R (FIG. 2).

In one example, the first motor 60 and the second motor 62 comprise electric servomotors, which are operable to drive the first speed reduction gear set 64 and the second speed reduction gear set 66, respectively. It should be noted that in certain instances, the first motor 60 and/or the second motor 62 may directly drive the differential gear set 68, if desired. The first motor 60 and the second motor 62 may comprise any suitable electric servomotor, including, but not limited to a brushless direct current (BLDC) motor, permanent magnet synchronous motor, variable or switched reluctance motor, stepper motor, etc. Generally, the first motor 60 and the second motor 62 are the same, however, in other embodiments, the first motor 60 may be different than the second motor 62. The first motor 60 and the second motor 62 are cylindrical, and are sized to be received within the cavity 38 and the second cavity 56 (FIG. 2). The first motor 60 and the second motor 62 may each include a respective housing 60*b*, 62*b*, which may enclose the respective one of the first motor 60 and the second motor 62 to protect the respective one of the first motor 60 and the second motor 62 from the environment. The first motor 60 may be positioned opposite the second motor 62 along a longitudinal axis L of the actuator system 16.

With reference to FIG. 2, in one example, the first motor 60 and the second motor 62 are each coupled to the frame 12 by a mounting bracket 76. The mounting bracket 76 may be composed of a metal, metal alloy or composite, and may be stamped, cast, machined, forged, additive manufactured, etc. In this example, the mounting bracket 76 includes a first end 78 opposite a second end 80, and a first mounting surface 82 opposite a second mounting surface 84. The first end 78 is coupled to the first frame member 18, and the second end 80 is coupled to the second frame member 20. Generally, the first end 78 and the second end 80 are fixedly coupled to the first frame member 18 and the second frame member 20 via welding, mechanical fasteners, rivets, etc. The first mounting surface 82 is coupled to the connecting frame member 22. In one example, the first mounting surface 82 is coupled to the connecting frame member 22 via welding, mechanical fasteners, rivets, etc. The second mounting surface 84 is coupled to the respective one of the first motor 60 and the second motor 62. The second mounting surface 84 is generally removably coupled to the respective one of the first motor 60 and the second motor 62 to enable the repair or replacement of the respective one of the first motor 60 and the second motor 62, if needed. In one example, the second mounting surface 84 is substantially C-shaped, and is coupled to the respective one of the first motor 60 and the second motor 62 via welding, mechanical fasteners, rivets, etc. Alternatively, the second mounting surface 84 may include engagement features, such as protrusions or other features, that engage a portion of the housing 60*b*, 62*b* of the respective one of the first motor 60 and the second motor 62. Thus, each of the mounting brackets 76 cooperate to couple the respective one of the first motor 60 and the second motor 62 to the frame 12.

It should be noted that the first motor 60 and the second motor 62 may be each coupled to the frame 12 in a different manner. In one example, the first mounting surface 82 of the mounting bracket 76 is removably coupled to the connecting frame member 22 via mechanical fasteners, rivets, etc. The second mounting surface 84 of the mounting bracket 76 is non-removably coupled to the first motor 60 and the second motor 62 (or the housings 60*b* and 62*b* of the first motor 60 and the second motor 62) via welding, for example. In this configuration, the first motor 60 and the second motor 62 are removable as a single unit with the mounting brackets 76, which may facilitate quicker maintenance and/or repairs of the actuator system 16.

With reference back to FIG. 3, the first motor 60 and the second motor 62 are in communication with the controller 74 over a suitable communication medium, such as a bus, for the transfer of data, commands, and power. The first motor 60 and the second motor 62 each include a respective output shaft 60*a*, 62*a*, which drives the respective one of the first speed reduction gear set 64 and the second speed reduction gear set 66. The first motor 60 and the second motor 62 are responsive to power received from the controller 74, for example, to rotate the output shafts 60*a*, 62*a* to drive the respective one of the first speed reduction gear set 64 and the second speed reduction gear set 66, which results in a movement of the primary flight control surface 14 to a desired position. In one example, a source of power for the controller 74, and thus, the first motor 60 and the second motor 62, may be associated with or onboard the aircraft 10 (FIG. 1).

The first speed reduction gear set 64 is driven by the output shaft 60*a* of the first motor 60, and the second speed reduction gear set 66 is driven by the output shaft 62*a* of the second motor 62. The first speed reduction gear set 64 is opposite the second speed reduction gear set 66 along the longitudinal axis L of the actuator system 16. In one example, each of the first speed reduction gear set 64 and the second speed reduction gear set 66 include, but are not limited to, a planetary gear set, spur gear set, bevel gear set, harmonic gear set, cycloidal gear set, etc. In this example, each of the first speed reduction gear set 64 and the second speed reduction gear set 66 comprise a planetary gear set having a concentric input and output shaft. In one example, each of the first speed reduction gear set 64 and the second speed reduction gear set 66 reduce a speed of the respective output shaft 60*a*, 62*a* by about 1 to about 0.001 and increase a torque of the respective output shaft 60*a*, 62*a* by about 1 to about 1000. Generally, each of the first speed reduction gear set 64 and the second speed reduction gear set 66 are the same, but the first speed reduction gear set 64 or the second speed reduction gear set 66 may be different to compensate for differences between the first motor 60 and the second motor 62, for example. As shown, the first speed reduction gear set 64 and the second speed reduction gear set 66 may be contained within a respective housing 85, 86. The housings 85, 86, in this example, are cylindrical, and substantially enclose a perimeter of the respective one of the first speed reduction gear set 64 and the second speed reduction gear set 66. It should be noted that the first speed reduction gear set 64 and the second speed reduction gear set 66 need not include the respective housings 85, 86, if desired. The first speed reduction gear set 64 and the second speed reduction gear set 66 are each coupled to the differential gear set 68.

It should be noted that in the example of each of the first speed reduction gear set 64 and the second speed reduction gear set 66 as spur gear sets having a parallel input and output shaft at a predefined distance, the first motor 60 and the second motor 62 may be moved more into the frame 12 to accommodate the use of spur gear sets. It should be noted that in some instances, each of the first speed reduction gear set 64 and the second speed reduction gear set 66 may be a combination of two or more gear sets. For example, each of the first speed reduction gear set 64 and the second speed reduction gear set 66 may include a first stage, which is a spur gear set, and a second stage, which includes a planetary gear set. In this example, the first motor 60 and the second motor 62 may be offset from the axis of rotation R (FIG. 2) of the primary flight control surface 14. As a further example, each of the first speed reduction gear set 64 and the second speed reduction gear set 66 may include a first stage, which is a bevel gear set, and a second stage, which includes a planetary gear set. In this example, the input and output axis may be at certain angle, which would enable mounting the first motor 60 and the second motor 62 at an arbitrary angle to the axis of rotation R (FIG. 2), which may be desirable in instances where room for the installation of the actuator system 16 is limited.

Generally, as shown in FIG. 3, the differential gear set 68 is coupled to the first speed reduction gear set 64 and the second speed reduction gear set 66 such that the differential gear set 68 is disposed within the slot 28 and the second slot 36 of the frame 12 to enable the differential gear set 68 to move freely relative to the frame 12. With reference to FIG.

Figure 4:
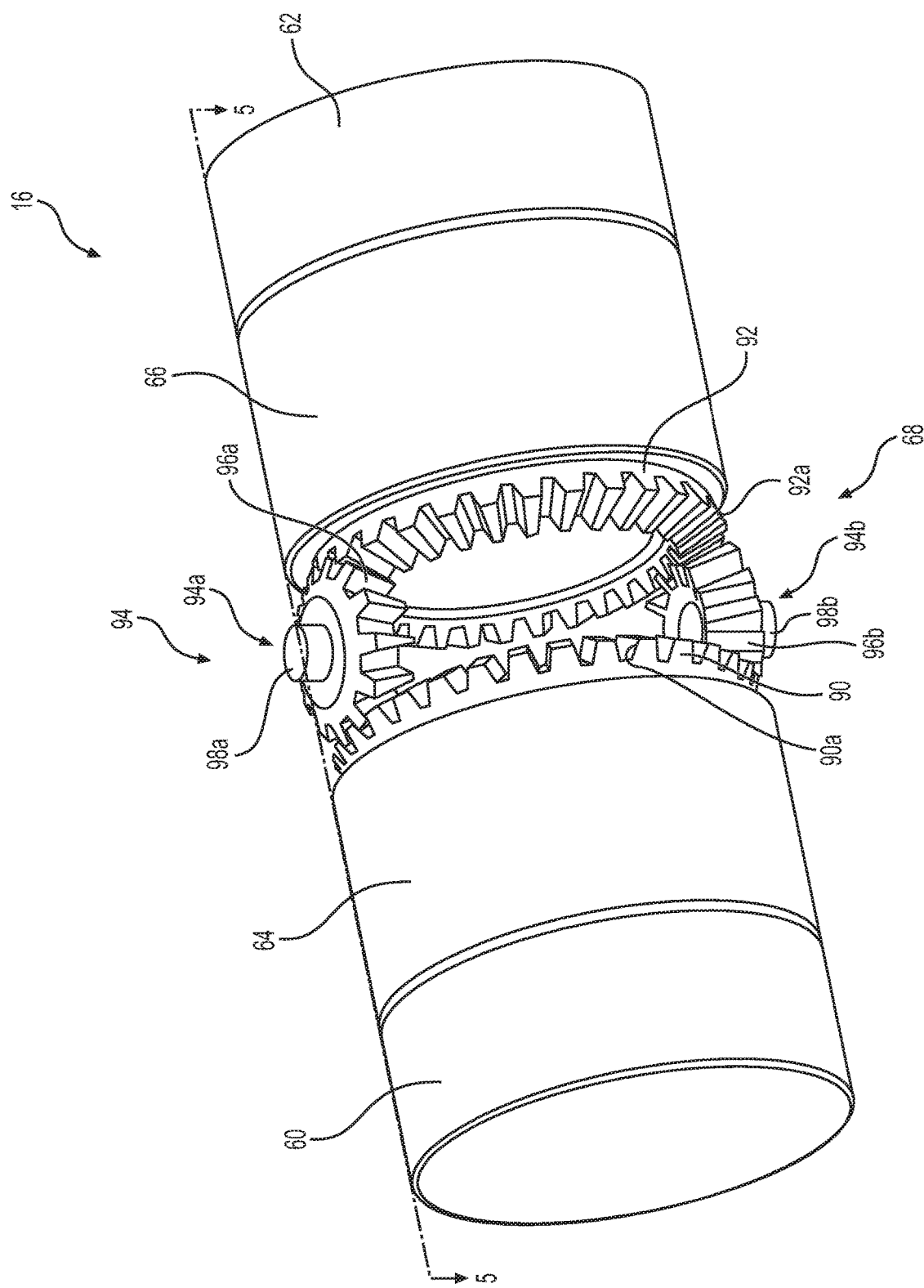
FIG. 4 is a perspective view of the actuator system removed from the aerial vehicle.

4, the differential gear set 68 is driven by the first speed reduction gear set 64 and the second speed reduction gear set 66 to move or rotate the primary flight control surface 14. In FIG. 4, the actuator system 16 is shown removed from the frame 12 and the primary flight control surface 14. In one example, the differential gear set 68 includes a first sun gear 90, a second sun gear 92 and at least one planet gear 94. In this example, the differential gear set 68 includes at least two planet gears 94a, 94b. Each of the first sun gear 90, the second sun gear 92 and the planet gears 94a, 94b may be composed of a metal, metal alloy or composite, and may be stamped, cast, machined, forged, additive manufactured, etc. The first sun gear 90 is coupled to the first speed reduction gear set 64, and the second sun gear 92 is coupled to the second speed reduction gear set 66. In one example, the first sun gear 90 is coupled, via mechanical fasteners, welding, etc. to a gear of the first speed reduction gear set 64 such that a movement of the gear of the first speed reduction gear set 64 drives the first sun gear 90. In other embodiments, the first sun gear 90 may be integrally formed with the gear of the first speed reduction gear set 64. In one example, the second sun gear 92 is coupled, via mechanical fasteners, welding, etc. to a gear of the second speed reduction gear set 66 such that a movement of the gear of the second speed reduction gear set 66 drives the second sun gear 92. In other embodiments, the second sun gear 92 may be integrally formed with the gear of the second speed reduction gear set 66.

In this example, each of the first sun gear 90 and the second sun gear 92 are annular and define a plurality of gear teeth 90a, 92a about a perimeter of the respective one of the first sun gear 90 and the second sun gear 92. In one example, the plurality of gear teeth 90a, 92a comprises a plurality of bevel gear teeth; however, other types of gear teeth may be employed depending upon the configuration of the differential gear set 68. The plurality of gear teeth 90a, 92a of the first sun gear 90 and the second sun gear 92 engage with each of the planet gears 94a, 94b to drive the planet gears 94a, 94b about the first sun gear 90 and the second sun gear 92.

Figure 5:
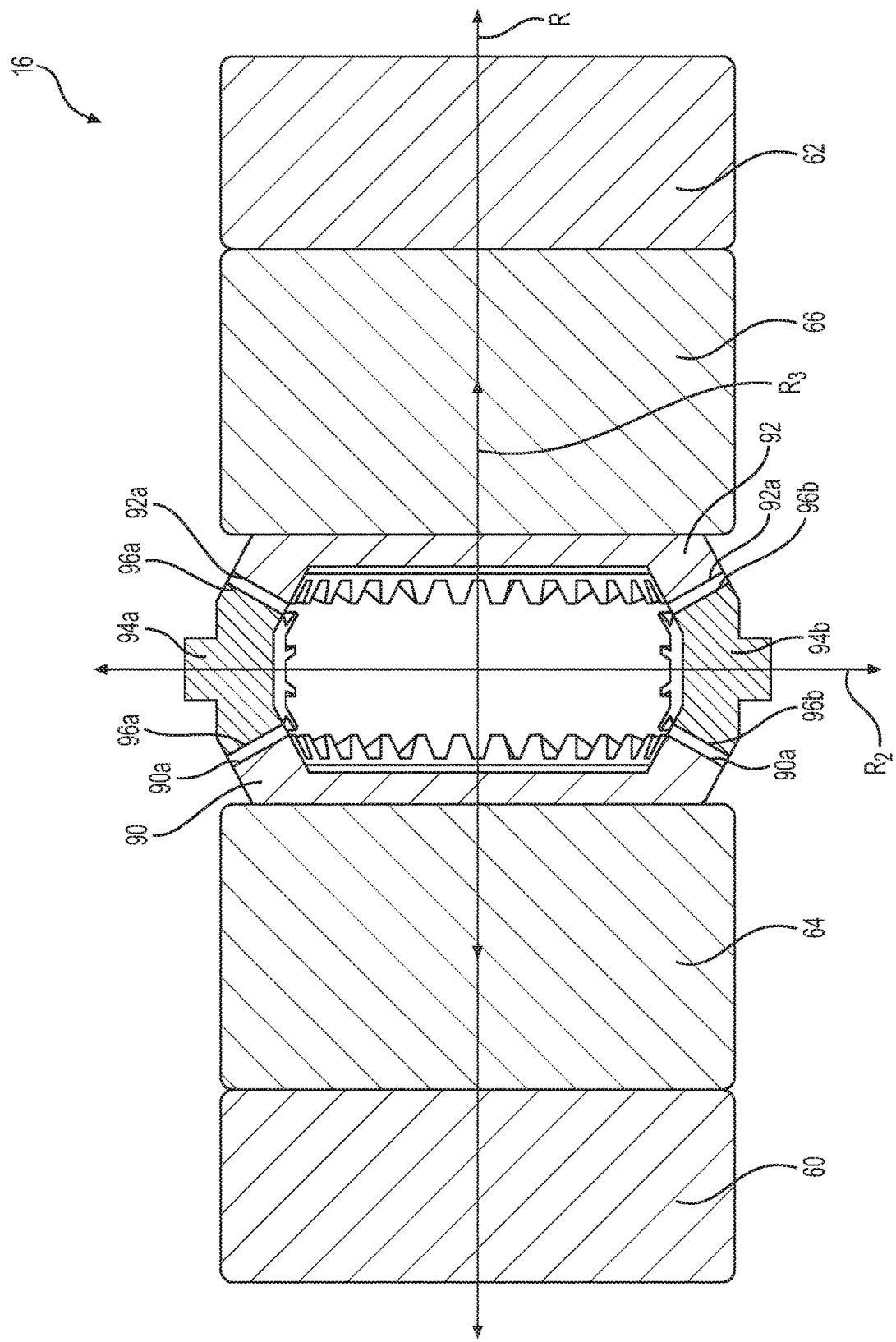
FIG. 5 is a cross-sectional view of the actuator system, taken along line 5-5 of FIG. 4.

The planet gears 94a, 94b are positioned between the first sun gear 90 and the second sun gear 92. Each of the planet gears 94a, 94b include a plurality of gear teeth 96a, 96b and a coupling post 98a, 98b. The plurality of gear teeth 96a, 96b are defined about a perimeter of the respective one of the planet gears 94a, 94b. In one example, the plurality of gear teeth 96a, 96b comprises a plurality of bevel gear teeth; however, other types of gear teeth may be employed depending upon the configuration of the differential gear set 68. With reference to FIG. 5, the plurality of gear teeth 96a, 96b engage with the plurality of gear teeth 90a, 92a of the respective one of the first sun gear 90 and the second sun gear 92 such that each of the first sun gear 90 and the second sun gear 92 drive the planet gears 94a, 94b. Thus, the first sun gear 90 and the second sun gear 92 cooperate to drive the planet gears 94a, 94b, which as will be discussed, results in a corresponding movement or rotation of the primary flight control surface 14 (FIG. 2). Generally, the planet gears 94a, 94b are coupled to the first sun gear 90 and the second sun gear 92 such that an axis of rotation R2 of the planet gears 94a, 94b is substantially transverse, and in this example, substantially perpendicular, to an axis of rotation R3 of the first sun gear 90 and the second sun gear 92. The axis of rotation R3 is coincident with the axis of rotation R of the primary flight control surface 14 (see also FIG. 2), the first motor 60 and the second motor 62.

The coupling post 98a, 98b couples the respective one of the planet gears 94a, 94b to the flange 70. In one example, the coupling post 98a, 98b is cylindrical, and extends outwardly away from the respective one of the planet gears 94a, 94b along the rotational axis R2. It should be noted that while the coupling posts 98a, 98b are illustrated as cylindrical, the coupling posts 98a, 98b may have any desired shape. The coupling posts 98a, 98b are generally symmetric along the axis of rotation R2, however, the coupling posts 98a, 98b may be offset, if desired. The coupling posts 98a, 98b are coupled to the flange 70 to move or drive the flange during a rotation of the planet gears 94a, 94b by the first sun gear 90 and the second sun gear 92.

Figure 6:
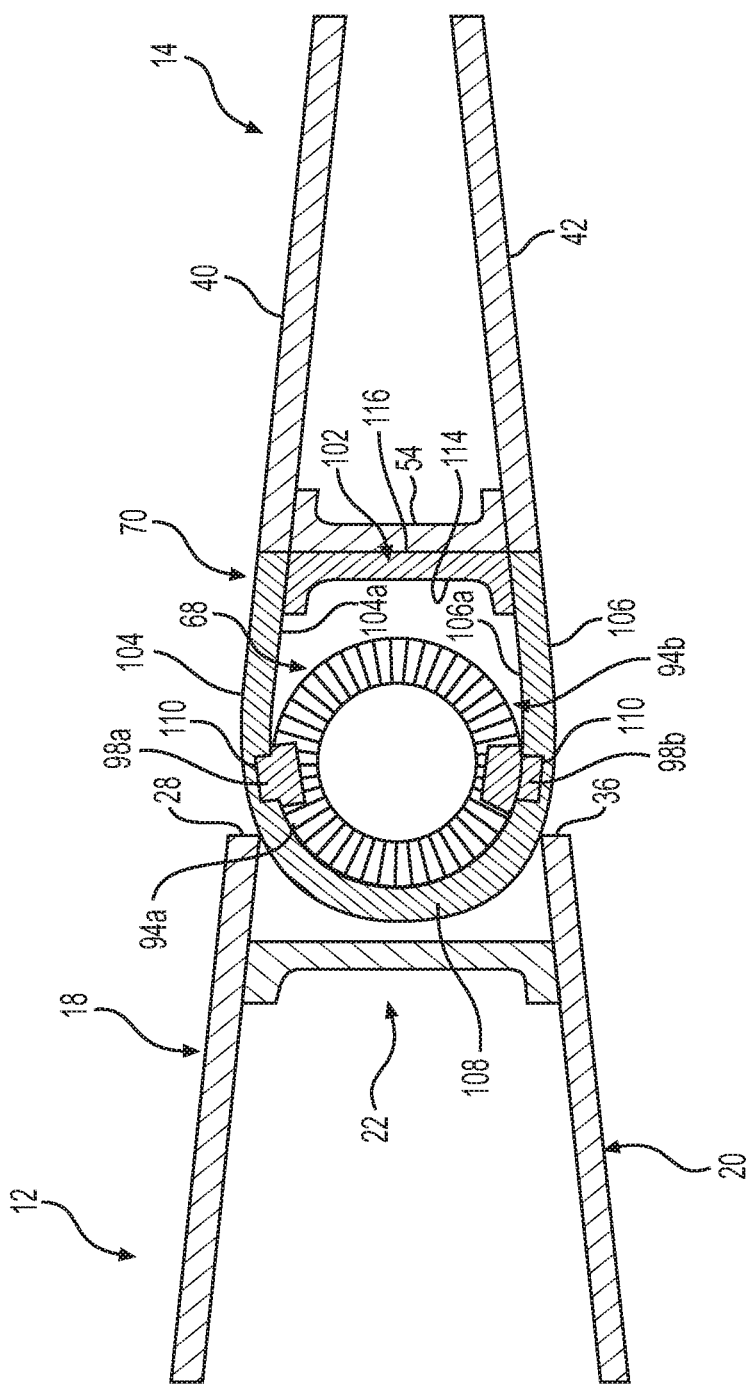
FIG. 6 is a cross-sectional view of the portion of the aerial vehicle, taken along line 6-6, of FIG. 1.

With reference to FIG. 6, the flange 70 couples the primary flight control surface 14 to the differential gear set 68. While discussed herein with regard to the actuator system 16, the flange 70 may be considered part of the primary flight control surface 14 such that the planet gears 94a, 94b are directly coupled to the primary flight control surface 14. In one example, the flange 70 includes a coupling portion 100 and a base 102. The flange 70 may be composed of a metal, metal alloy or composite, and may be stamped, cast, machined, forged, additive manufactured, etc. The coupling portion 100 is substantially U-shaped, and is sized to be positioned about the planet gears 94a, 94b. In one example, with brief reference to FIG. 1, the coupling portion 100 has a width W, which is about equal to or slightly less than a width W1 of the slot 28 and second slot 36. The width W is about equal to or slightly less than a width W2 of the notch 52 of the primary flight control surface 14. The slight difference in the widths W, W1, W2 enables the primary flight control surface 14 to move or rotate relative to the frame 12 without contacting the frame 12. With reference back to FIG. 6, the coupling portion 100 has a first side 104 opposite a second side 106 and a curved sidewall 108. The curved sidewall 108 interconnects the first side 104 and the second side 106. The first side 104 is coupled to the base 102 and is positioned proximate the first control surface 40, and the second side 106 is coupled to the base 102 and is positioned proximate the second control surface 42. The first side 104 and the second side 106 each define a post receptacle 110 on an interior surface 104a, 106a. The post receptacle 110 is sized and shaped to receive the coupling post 98a, 98b of the respective one of the planet gears 94a, 94b. In this example, the post receptacle 110 is a cylindrical recess, however, the post receptacle 110 may have any desired shape. Generally, the post receptacle 110 is defined in the coupling portion 100 so as to be proximate or adjacent to the curved sidewall 108.

The base 102 is coupled to the coupling portion 100 and to the interconnecting member 54. In one example, the base 102 is sized to be received between the first side 104 and the second side 106, and is coupled to the interior surface 104a, 106a of each of the first side 104 and the second side 106. The base 102 is coupled to the first side 104 and the second side 106 via any suitable technique, including, but not limited to welding, mechanical fasteners, adhesives, etc. The base 102 may have a substantially C-shape to facilitate coupling to the first side 104 and the second side 106, however, it should be noted that the base 102 may have any desired shape. The base 102 includes a first base side 114 opposite a second base side 116. The first base side 114 faces the planet gears 94a, 94b, and the second base side 116 is coupled to the interconnecting member 54. The second base side 116 is coupled to the interconnecting member 54 via any suitable technique, including, but not limited to welding, mechanical fasteners, adhesives, etc. The base 102 is coupled to the interconnecting member 54 such that the primary flight control surface 14 moves with the movement of flange 70, with the flange 70 being driven by the planet gears 94a, 94b. Thus, the primary flight control surface 14, via the connection between the flange 70 and the interconnecting member 54 is directly coupled to the differential gear set 68, while the first motor 60 and the second motor 62 are directly coupled to the frame 12.

Figure 6A:
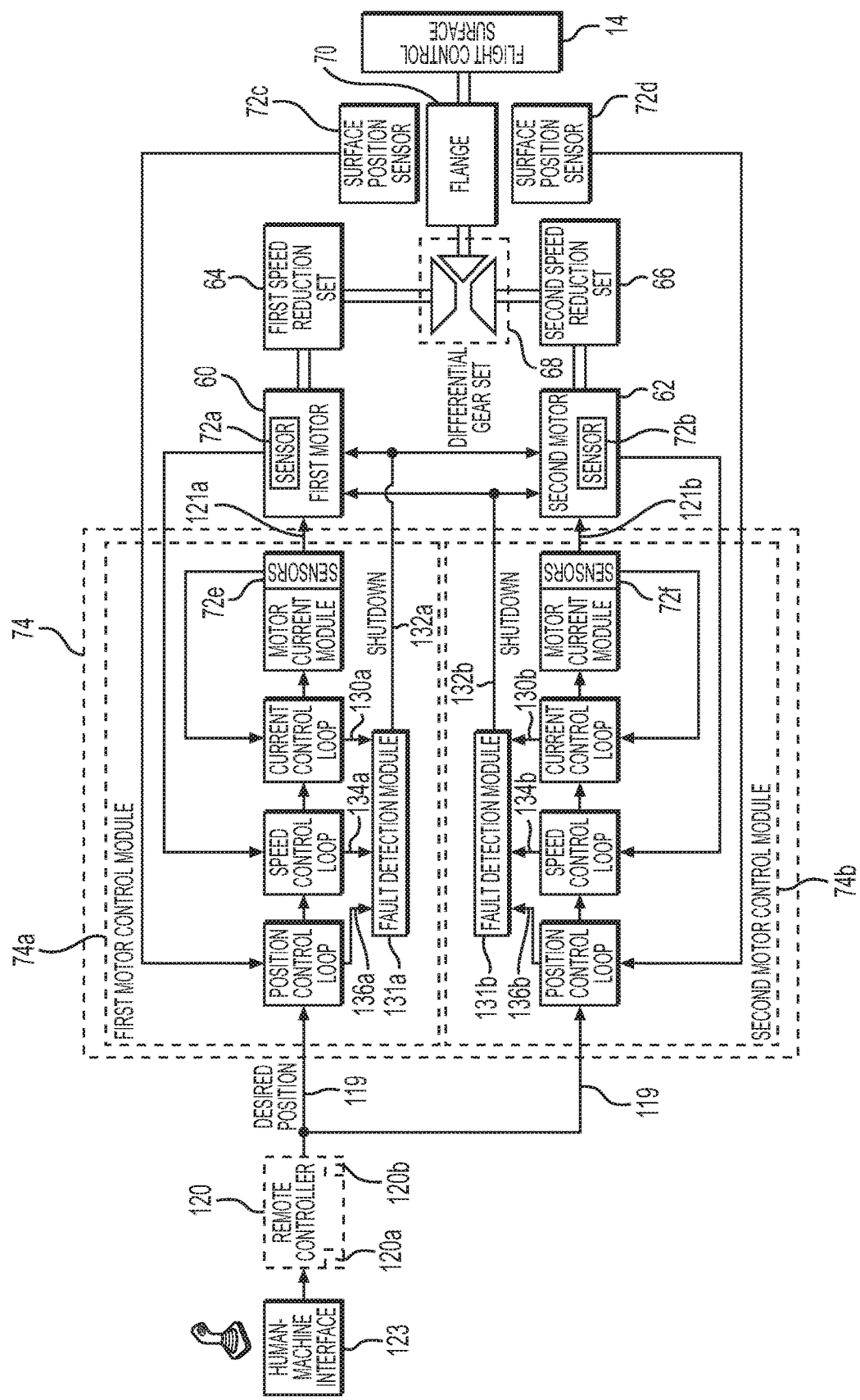
FIG. 6A is a schematic diagram of an exemplary control system for the actuator system of FIG. 1.

With reference to FIG. 6A, the one or more sensors 72 observe one or more conditions associated with the actuator system 16 and transmit sensor signals to the controller 74 and/or a remote controller 120 associated with the aircraft 10. The one or more sensors 72 are in communication with the controller 74 and/or the remote controller 120 associated with the aircraft 10 over a suitable communication architecture that facilitates the transfer of data, power, etc., including, but not limited to, a bus. In one example, the one or more sensors 72 include, but are not limited to, a first motor position sensor 72a, a second motor position sensor 72b, a first surface position sensor 72c, a second surface position sensor 72d, a first motor current sensor 72e and a second motor current sensor 72f. The first motor position sensor 72a may be coupled to the first motor 60 to observe a position of the output shaft 60a of the first motor 60 and to generate sensor signals based on the observation. The first motor position sensor 72a comprises any suitable position sensor, including, but not limited to, a Hall-effect sensor, a rotary encoder, a resolver, etc. The first motor position sensor 72a may be coupled to the output shaft 60a to observe an angular position of the output shaft 60a and to generate sensor signals based thereon.

The second motor position sensor 72b may be coupled to the second motor 62 to observe a position of the output shaft 62a of the second motor 62 and to generate sensor signals based on the observation. The second motor position sensor 72b comprises any suitable position sensor, including, but not limited to, a Hall-effect sensor, a rotary encoder, a resolver, etc. The second motor position sensor 72b may be coupled to the output shaft 62a to observe an angular position of the output shaft 62a and to generate sensor signals based thereon.

The first surface position sensor 72c and the second surface position sensor 72d may each be coupled to the frame 12 and may each observe the position of the primary flight control surface 14. Each of the first surface position sensor 72c and the second surface position sensor 72d comprises any suitable position sensor, including, but not limited to a Hall-effect sensor, a rotary encoder, a resolver, etc. In one example, the first surface position sensor 72c may be coupled to the connecting frame member 22, proximate the slot 28 to observe the position of the primary flight control surface 14 and generate sensor signals based on the observation. In another example, each of the first surface position sensor 72c and the second surface position sensor 72d may be coupled to the connecting frame member 22 so as to be spaced apart from the actuator system 16 and from each other to observe the position of the primary flight control surface 14 and generate sensor signals based thereon. As a further example, the first surface position sensor 72c may be coupled between the housing 60b of the first motor 60 or the housing 85 of the first speed reduction gear set 64 and the coupling portion 100 to observe the position of the primary flight control surface 14 and generate sensor signals based thereon; and the second surface position sensor 72d may be coupled between the housing 62b of the second motor 62 or the second speed reduction gear set 66 (FIG. 2) and the coupling portion 100 to observe the position of the primary flight control surface 14 and generate sensor signals based thereon. In yet another example, the first surface position sensor 72c and the second surface position sensor 72d are coupled to opposed sides of the mounting bracket 76 to observe the position of the primary flight control surface 14.

The first motor current sensor 72e and the second motor current sensor 72f are coupled to the first motor 60 and the second motor 62. The first motor current sensor 72e and the second motor current sensor 72f observe a current of the first motor 60 and the second motor 62, respectively, and generate sensor signals based thereon. The first motor current sensor 72e and the second motor current sensor 72f comprise any suitable current sensor for observing a current of a motor, including, but not limited to, a Hall effect sensor. In addition, the sensors 72 may also include voltage sensors for observing a voltage associated with the first motor 60 and the second motor 62, respectively.

The controller 74 is in communication with the first motor 60, the second motor 62 and the sensors 72a-72f over a suitable communication architecture that facilitates the transfer of power, data and commands, such as a bus. The controller 74 may also be in communication with the remote controller 120 associated with the aircraft 10 or the first motor 60, the second motor 62 and the sensors 72a-72f may be in communication with the remote controller 120 or a controller associated with the aircraft 10 that is positioned remotely from the actuator system 16 over a suitable communication architecture that facilitates the transfer of data, power, etc., including, but not limited to, a bus. The controller 74 is also in communication with a power source associated with the aircraft 10 (FIG. 1) over a suitable communication architecture that facilitates the transfer of power, data and commands, such as a bus. In this example, the controller 74 is responsive to a flight surface position received as input from the remote controller 120 to output one or more control signals to the first motor 60 and the second motor 62 to rotate the output shafts 60a, 62a to move the primary flight control surface 14 to the flight surface position received from the remote controller 120. The remote controller 120 has at least one processor 120a and at least one computer readable storage device or media 120b. It should be noted that in other embodiments, the controller 74 may receive the flight surface position directly from a sensor that observes a position of the cockpit controls, and thus, in certain embodiments, the remote controller 120 may be optional.

The controller 74 includes at least one processor 122 and a computer readable storage device or media 124. The processor 122 can be any custom made or commercially available processor, a central processing unit (CPU), a graphics processing unit (GPU), an auxiliary processor among several processors associated with the controller 74, a semiconductor based microprocessor (in the form of a microchip or chip set), a macroprocessor, any combination thereof, or generally any device for executing instructions. The computer readable storage device or media 124 may include volatile and nonvolatile storage in read-only memory (ROM), random-access memory (RAM), and keep-alive memory (KAM), for example. KAM is a persistent or non-volatile memory that may be used to store various operating variables while the processor 122 is powered down. The computer-readable storage device or media 124 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 74 in controlling the first motor 60 and the second motor 62 of the actuator system 16, respectively. In one example, the controller 74 includes two current controllers, however, it should be understood that other techniques may be employed to control the first motor 60 and the second motor 62, respectively.

The instructions may include one or more separate programs, each of which comprises an ordered listing of executable instructions for implementing logical functions. The instructions, when executed by the processor 122, receive and process signals from the sensors 72 (FIG. 6A), receive and process signals from the remote controller 120, perform logic, calculations, methods and/or algorithms for automatically controlling the components of the actuator system 16, and generate control signals to the first motor 60 and the second motor 62 to automatically control the position of the primary flight control surface 14 based on the logic, calculations, methods, and/or algorithms. The instructions may include one or more separate programs, each of which comprises an ordered listing of executable instructions for implementing logical functions.

In various embodiments, with reference to FIG. 6A, a schematic diagram of an exemplary control system for controlling the actuator system 16 is shown. In one example, as shown in FIG. 3, the controller 74 includes a first motor control module 74a and a second motor control module 74b embedded within the controller 74. Although the controller 74 is shown with two motor control modules associated with the actuator system 16 in FIG. 6A, as discussed, embodiments of the present disclosure can include any number of controllers 74 or remote controllers 120 that communicate over any suitable communication medium or a combination of communication mediums and that cooperate to process the sensor signals, perform logic, calculations, methods, and/or algorithms, and generate control signals to automatically control features of the actuator system 16. One or more instructions of the first motor control module 74a receive a flight surface position 119 from the remote controller 120, and based on the flight surface position 119 and the sensor signals from the sensors 72, output one or more control signals 121a the first motor 60 to drive the output shaft 60a to move the primary flight control surface 14 to the flight surface position 119. Generally, the flight surface position 119 may be received by the remote controller 120 as input from a human-machine interface 123 associated with the aircraft 10, such as one or more cockpit controls, or from other modules associated with the aircraft 10. Based on the flight surface position 119, the first motor control module 74a may access a look-up table, for example, stored in the media 124, and determine the amount of output for the first motor 60 to move the primary flight control surface 14 to the flight surface position 119. Based on the amount of output of the output shaft 60a, the first motor control module 74a outputs one or more control signals 121a to the first motor 60 to drive the output shaft 60a.

In one example, the first motor control module 74a may include a current control loop, and may receive and process the sensor signals from the first motor current sensor 72e. Based on the sensor signals, the first motor control module 74a may determine whether the current input to the first motor 60 is substantially the same as the current observed by the first motor current sensor 72e in a current control loop. If false, the first motor control module 74a determines a fault 130a with the first motor 60. Based on the receipt of the fault 130a as input to a fault detection module 131a, the fault detection module 131a outputs one or more control signals 132a to the first motor 60 and the second motor 62 to cease the operation of the first motor 60 and the second motor 62. By ceasing the operation of the first motor 60 and the second motor 62, the fault detection module 131a ensures that the actuator system 16 maintains control over the position of the primary flight control surface 14.

The first motor control module 74a may receive and process the sensor signals from the first motor position sensor 72a, and determine, in a position control loop, based on the sensor signals, whether the output shaft 60a of the first motor 60 has reached the desired position to result in the flight surface position 119 received as input. The first motor control module 74a may also process the sensor signals from the first motor position sensor 72a and determine whether a fault 134a is associated with the first motor 60. In this regard, if the position of the output shaft 60a indicates that the output shaft 60a is not moving or is not moving at an expected rate, the first motor control module 74a may determine the fault 134a. Based on the determination of the fault 134a, the fault detection module 131a outputs the one or more control signals 132a to the first motor 60 and the second motor 62 to cease the operation of the first motor 60 and the second motor 62.

The first motor control module 74a also receives and processes the sensor signals from the first surface position sensor 72c. The first motor control module 74a determines, based on the sensor signals from the first surface position sensor 72c, the position of the primary flight control surface 14. In certain instances, the first motor control module 74a may output the one or more control signals to the first motor 60 until the flight surface position 119 received as input matches the determined position of the primary flight control surface 14 in a position control loop. In other embodiments, the first motor control module 74a may determine whether the primary flight control surface 14 position is moving toward the flight surface position 119 received as input. Based on a determination that the position of the primary flight control surface 14 is not advancing toward the flight surface position 119 received as input, the first motor control module 74a sets a fault 136a for the fault detection module 131a. Based on the fault 136a, the fault detection module 131a outputs the one or more control signals 132a to the first motor 60 and the second motor 62 to cease the operation of the first motor 60 and the second motor 62. In still other embodiments, the first motor control module 74a may determine whether the primary flight control surface 14 position matches the flight surface position 119 and may output one or more notifications to the remote controller 120 based on the determination that the primary flight control surface 14 position observed by the first surface position sensor 72c does not match the flight surface position 119.

In various embodiments, one or more instructions of the second motor control module 74b receive the flight surface position 119 from the remote controller 120, and based on the flight surface position 119 and the sensor signals from the sensors 72, output one or more control signals 121b to the second motor 62 to drive the output shaft 62a to move the primary flight control surface 14 to the flight surface position 119. Based on the flight surface position 119, the second motor control module 74b may access a look-up table, for example, stored in the media 124, and determine the amount of output for the second motor 62 to move the primary flight control surface 14 to the flight surface position 119. Based on the amount of output of the output shaft 62*a*, the second motor control module 74*b* outputs the one or more control signals 121*b* to the second motor 62 to drive the output shaft 62*a*.

In one example, the second motor control module 74*b* may include a current control loop, and may receive and process the sensor signals from the second motor current sensor 72*f*. Based on the sensor signals, the second motor control module 74*b* may determine whether the current input to the second motor 62 is substantially the same as the current observed by the second motor current sensor 72*f* in a current control loop. If false, the second motor control module 74*b* determines a fault 130*b* with the second motor 62. Based on the receipt of the fault 130*b* as input to a fault detection module 131*b*, the fault detection module 131*b* outputs one or more control signals 132*b* to the first motor 60 and the second motor 62 to cease the operation of the first motor 60 and the second motor 62.

The second motor control module 74*b* may receive and process the sensor signals from the second motor position sensor 72*b*, and determine, in a position control loop, based on the sensor signals, whether the output shaft 62*a* of the second motor 62 has reached the desired position to result in the flight surface position 119 received as input. The second motor control module 74*b* may also process the sensor signals from the second motor position sensor 72*b* and determine whether a fault 134*b* is associated with the second motor 62. In this regard, if the position of the output shaft 62*a* indicates that the output shaft 62*a* is not moving or is not moving at an expected rate, the second motor control module 74*b* may determine the fault 134*b*. Based on the determination of the fault 134*b*, the fault detection module 131*b* outputs the one or more control signals 132*b* to the first motor 60 and the second motor 62 to cease the operation of the first motor 60 and the second motor 62.

The second motor control module 74*b* also receives and processes the sensor signals from the second surface position sensor 72*d*. The second motor control module 74*b* determines, based on the sensor signals from the second surface position sensor 72*d*, the position of the primary flight control surface 14. In certain instances, the second motor control module 74*b* may output the one or more control signals to the second motor 62 until the flight surface position 119 received as input matches the determined position of the primary flight control surface 14 in a position control loop. In other embodiments, the second motor control module 74*b* may determine whether the primary flight control surface 14 position is moving toward the flight surface position 119 received as input. Based on a determination that the position of the primary flight control surface 14 is not advancing toward the flight surface position 119 received as input, the second motor control module 74*b* sets a fault 136*b* for the fault detection module 131*b*. Based on the fault 136*b*, the fault detection module 131*b* outputs the one or more control signals 132*b* to the first motor 60 and the second motor 62 to cease the operation of the first motor 60 and the second motor 62. In still other embodiments, the second motor control module 74*b* may determine whether the primary flight control surface 14 position matches the flight surface position and may output one or more notifications to the remote controller 120 based on the determination that the primary flight control surface 14 position observed by the second surface position sensor 72*d* does not match the flight surface position 119.

Thus, in instances where the first motor 60 or the second motor 62 has the fault 130*a*, 130*b*; 134*a*, 134*b*; 136*a*, 136*b* or is not operating properly, the first motor control module 74*a* or the second motor control module 74*b* may control the other of the first motor 60 and the second motor 62, respectively, to compensate for the improper operation and to ensure the movement of the primary flight control surface 14 to the flight surface position 119. In addition, while typically the controller 74 controls the first motor 60 and the second motor 62, respectively, via the one or more control signals 121*a*, 121*b*, to rotate the output shafts 60*a*, 62*a* in the same direction, in instances when the first motor 60 or the second motor 62 is not operating properly, the controller 74 may control the other of the first motor 60 and the second motor 62 to rotate the respective output shaft 60*a*, 62*a* in an opposite direction or in both directions (clockwise and counterclockwise) to ensure that the primary flight control surface 14 is moved to the desired position and remains movable over the full range of motion. Thus, the use of the controller 74 enables the actuator system 16 to detect a fault with one of the first motor 60 or the second motor 62 and control the other of the first motor 60 and the second motor 62 to ensure the movement of the primary flight control surface 14.

Figure 6B:
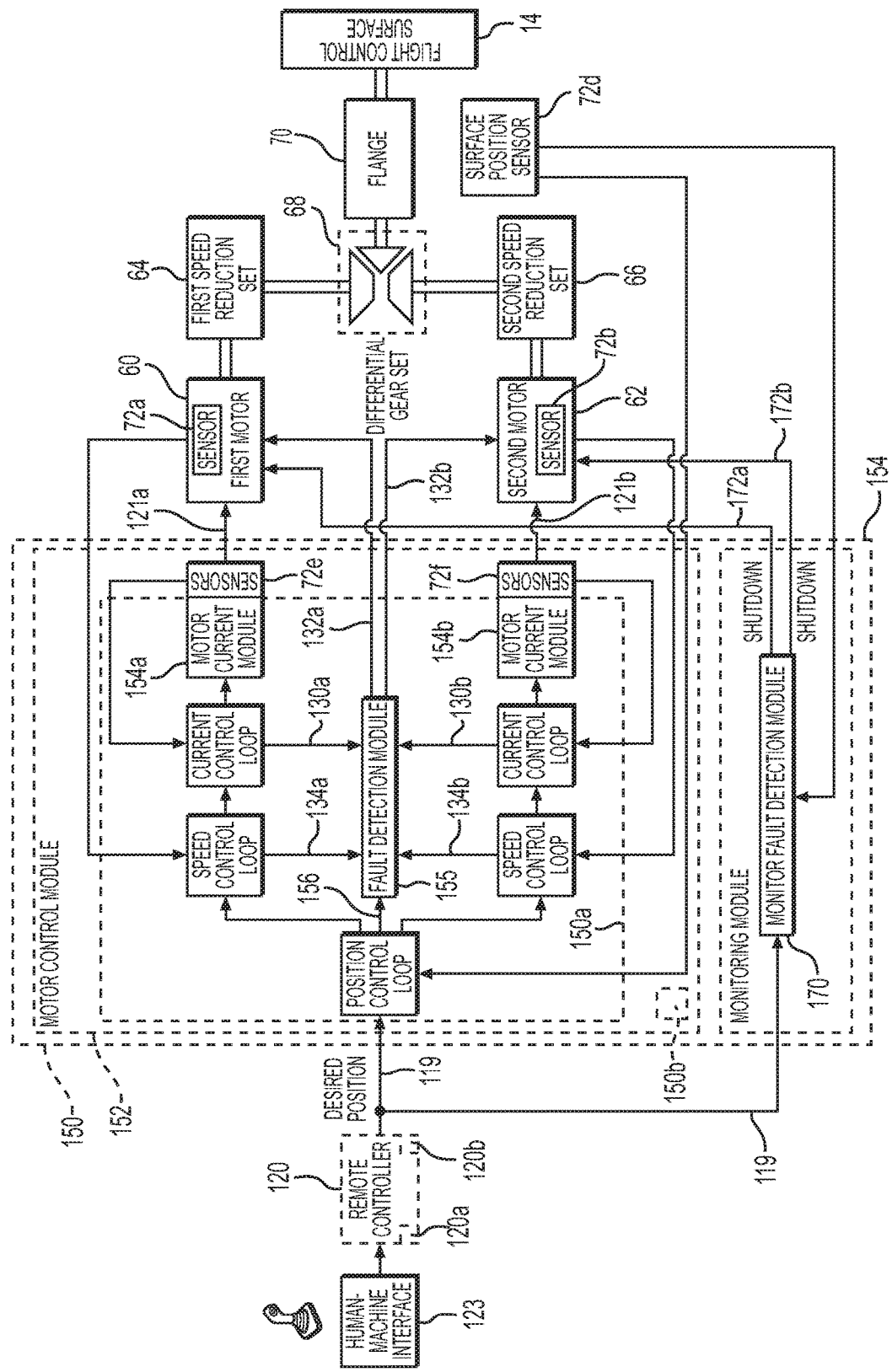
FIG. 6B is a schematic diagram of another exemplary control system for the actuator system of FIG. 1.

It should be noted that in other embodiments, the controller 74 may be configured differently to control the actuator system 16 to move or rotate the primary flight control surface 14 relative to the frame 12. For example, with reference to FIG. 6B, a schematic diagram of an exemplary control system for controlling the actuator system 16 is shown. In FIG. 6B, a controller 150 controls the actuator system 16 to move or rotate the primary flight control surface 14 relative to the frame 12. As the control system and controller 150 shown in FIG. 6B includes components that are the same or similar to components of the control system and controller 74 discussed with regard to FIG. 6A, the same reference numerals will be used to denote the same or similar components. In this example, the sensors 72 include a single surface position sensor, for example, the second surface position sensor 72*d*, and the actuator system 16 is controlled based on the sensor signals from the single second surface position sensor 72*d*.

The controller 150 includes at least one processor 150*a* and a computer readable storage device or media 150*b*. The processor 150*a* can be any custom made or commercially available processor, a central processing unit (CPU), a graphics processing unit (GPU), an auxiliary processor among several processors associated with the controller 150, a semiconductor based microprocessor (in the form of a microchip or chip set), a macroprocessor, any combination thereof, or generally any device for executing instructions. The computer readable storage device or media 150*b* may include volatile and nonvolatile storage in read-only memory (ROM), random-access memory (RAM), and keep-alive memory (KAM), for example. KAM is a persistent or non-volatile memory that may be used to store various operating variables while the processor 150*a* is powered down. The computer-readable storage device or media 150*b* may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 150 in controlling the first motor 60 and the second motor 62 of the actuator system 16, respectively. In one example, the controller 150 comprises two current controllers for controlling the respective one of the first motor 60 and the second motor 62, however, it should be understood that other techniques may be employed to control the first motor 60 and the second motor 62, respectively.

The instructions may include one or more separate programs, each of which comprises an ordered listing of executable instructions for implementing logical functions. The instructions, when executed by the processor 150a, receive and process signals from the sensors 72a, 72b, 72d, 72e, 72f receive and process signals from the remote controller 120, perform logic, calculations, methods and/or algorithms for automatically controlling the components of the actuator system 16, and generate control signals to the first motor 60 and the second motor 62 to automatically control the position of the primary flight control surface 14 based on the logic, calculations, methods, and/or algorithms. The instructions may include one or more separate programs, each of which comprises an ordered listing of executable instructions for implementing logical functions. In one example, as shown in FIG. 6B, the controller 150 includes a motor control module 152 and a monitoring module 154 embedded within the controller 150.

In various embodiments, one or more instructions of the motor control module 152 receive the flight surface position 119 from the remote controller 120, and based on the flight surface position 119, output one or more control signals 121a the first motor 60 to drive the output shaft 60a and output one or more control signals 121b the second motor 62 to drive the output shaft 62a to move the primary flight control surface 14 to the flight surface position. Based on the flight surface position 119, the motor control module 152 may access a look-up table, for example, stored in the media 150b, and determine the amount of output for the first motor 60 and the second motor 62 to move the primary flight control surface 14 to the flight surface position 119. Based on the amount of output of the output shafts 60a, 62a, the motor control module 152 outputs the one or more control signals 121a, 121b to the first motor 60 and the second motor 62, respectively, to drive the output shafts 60a, 62a.

In one example, the motor control module 152 may include a current control loop, and may receive and process the sensor signals from the first motor current sensor 72e. Based on the sensor signals, the motor control module 152 may determine whether the current input to the first motor 60 is substantially the same as the current observed by the first motor current sensor 72e in a current control loop. If false, the motor control module 152 determines the fault 130a with the first motor 60. Based on the receipt of the fault 130a as input to a fault detection module 155, the fault detection module 155 outputs the one or more control signals 132a to the first motor 60 to cease the operation of the first motor 60.

The motor control module 152 may receive and process the sensor signals from the first motor position sensor 72a, and determine, in a position control loop, based on the sensor signals, whether the output shaft 60a of the first motor 60 has reached the desired position to result in the flight surface position 119 received as input. The motor control module 152 may also process the sensor signals from the first motor position sensor 72a and determine whether the fault 134a is associated with the first motor 60. In this regard, if the position of the output shaft 60a indicates that the output shaft 60a is not moving or is not moving at an expected rate, the motor control module 152 may determine the fault 134a. Based on the determination of the fault 134a, the fault detection module 155 outputs the one or more control signals 132a to the first motor 60 to cease the operation of the first motor 60.

In one example, the motor control module 152 may include a current control loop for the second motor 62, and may receive and process the sensor signals from the second motor current sensor 72f. Based on the sensor signals, the motor control module 152 may determine whether the current input to the second motor 62 is substantially the same as the current observed by the second motor current sensor 72f in the current control loop. If false, the motor control module 152 determines the fault 130b with the second motor 62. Based on the receipt of the fault 130b as input to the fault detection module 155, the fault detection module 155 outputs the one or more control signals 132b to the second motor 62 to cease the operation of the second motor 62.

The motor control module 152 may receive and process the sensor signals from the second motor position sensor 72b, and determine, in a position control loop, based on the sensor signals, whether the output shaft 62a of the second motor 62 has reached the desired position to result in the flight surface position 119 received as input. The motor control module 152 may also process the sensor signals from the second motor position sensor 72b and determine whether the fault 134b is associated with the second motor 62. In this regard, if the position of the output shaft 62a indicates that the output shaft 62a is not moving or is not moving at an expected rate, the motor control module 152 may determine the fault 134b. Based on the determination of the fault 134b, the fault detection module 131b outputs the one or more control signals 132b to the second motor 62 to cease the operation of the second motor 62.

The motor control module 152 also receives and processes the sensor signals from the second surface position sensor 72d. The motor control module 152 determines, based on the sensor signals from the second surface position sensor 72d, the position of the primary flight control surface 14. In certain instances, the motor controller 152 may output the one or more control signals to the first motor 60 and the second motor 62 until the flight surface position received as input matches the determined position of the primary flight control surface 14 in a position control loop. In other embodiments, the motor control module 152 may determine whether the primary flight control surface 14 position is moving toward the flight surface position 119 received as input. Based on a determination that the position of the primary flight control surface 14 is not advancing toward the flight surface position 119 received as input, the first motor controller 74a sets a fault 156 for the fault detection module 155. Based on the fault 156, the fault detection module 155 outputs the one or more control signals 132a for the first motor 60 and/or the one or more control signals 132b for the second motor 62 to cease the operation of the first motor 60 and/or the second motor 62. In still other embodiments, the motor control module 152 may determine whether the primary flight control surface 14 position matches the flight surface position 119 and may output one or more notifications to the remote controller 120 based on the determination that the primary flight control surface 14 position observed by the first surface position sensor 72c does not match the flight surface position 119.

The monitoring module 154 includes a monitoring fault detection module 170. The monitoring fault detection module 170 receives as input the flight surface position 119 from the remote controller 120. The monitoring fault detection module 170 also receives as input the sensor signals from the second surface position sensor 72d. The monitoring fault detection module 170 processes the sensor signals and determines the position of the primary flight control surface 14. The monitoring fault detection module 170 compares the determined position of the primary flight control surface 14 (from the sensor signals) to the flight surface position 119 and determines whether the primary flight control surface 14 is observed to be moving toward the flight surface position 119. If false, the monitoring fault detection module 170 outputs one or more control signals 172a, 172b for the first motor 60 and the second motor 62, respectively, to cease the operation of or shutdown the first motor 60 and the second motor 62, respectively. Thus, the monitoring module 154 provides a separate monitoring of the actuator system 16 to ensure the position of the primary flight control surface 14 is moving as desired by the remote controller 120.

Thus, in instances where the first motor 60 or the second motor 62 has the fault 130a, 130b; 134a, 134b; 156 or is not operating properly, the controller 150 may control the other of the first motor 60 and the second motor 62, respectively, to compensate for the improper operation and to ensure the movement of the primary flight control surface 14 to the flight surface position 119. In addition, while typically the controller 150 controls the first motor 60 and the second motor 62 via the one or more control signals 121a, 121b, respectively, to rotate the output shafts 60a, 62a in the same direction, in instances when the first motor 60 or the second motor 62 is not operating properly, the controller 150 may control the other of the first motor 60 and the second motor 62 to rotate the respective output shaft 60a, 62a in an opposite direction or in both directions (clockwise and counterclockwise) to ensure that the primary flight control surface 14 is moved to the desired position and remains movable over the full range of motion. Thus, the use of the controller 150 enables the actuator system 16 to detect a fault with one of the first motor 60 or the second motor 62 and control the other of the first motor 60 and the second motor 62 to ensure the movement of the primary flight control surface 14.

In one example, with reference back to FIG. 2, in order to assemble the actuator system 16, with the mounting brackets 76 formed, the mounting brackets 76 are coupled to the connecting frame member 22 so as to be on opposed sides of the slot 28 and the second slot 36. The first surface position sensor 72c is coupled to the frame 12. With reference to FIG. 5, with the first sun gear 90 and the first speed reduction gear set 64 assembled, the first sun gear 90 is coupled to the first speed reduction gear set 64 such that the first sun gear 90 may be driven by the first speed reduction gear set 64. With the second sun gear 92 and the second speed reduction gear set 66 assembled, the second sun gear 92 is coupled to the second speed reduction gear set 66 such that the second sun gear 92 may be driven by the second speed reduction gear set 66. The first motor position sensor 72a and the second motor position sensor 72b are coupled to the respective one of the first motor 60 and the second motor 62. The first motor 60 is coupled to the first speed reduction gear set 64 such that the output shaft 60a may drive the first speed reduction gear set 64, and the second motor 62 is coupled to the second speed reduction gear set 66 such that the output shaft 62a may drive the second speed reduction gear set 66. With the planet gears 94a, 94b formed, the planet gears 94a, 94b are coupled to the first sun gear 90 and the second sun gear 92 such that the plurality of gear teeth 90a, 92a, 96a, 96b engage. With the flange 70 formed, the flange 70 is coupled to the planet gears 94a, 94b such that the coupling posts 98a, 98b are received within each of the post receptacles 110. The actuator system 16 is coupled to the frame 12, and the first motor 60 and the second motor 62 are each coupled to the respective one of the mounting brackets 76 (FIG. 2). With reference to FIG. 6, the base 102 of the flange 70 is coupled to the interconnecting member 54 of the primary flight control surface 14 to couple the actuator system 16 to the primary flight control surface 14. The sensors 72 are coupled to the controller 74, 150 so as to be in communication with the controller 74, 150. The controller 74, 150 may be coupled to the frame 12, and may be placed in communication with the remote controller 120 and the source of power.

Upon receipt of the flight surface position, the controller 74, 150 outputs one or more control signals to the first motor 60 and the second motor 62 to rotate the output shafts 60a, 62a. The rotation of the output shaft 60a drives the first speed reduction gear set 64, which drives the first sun gear 90. The rotation of the output shaft 62a drives the second speed reduction gear set 66, which drives the second sun gear 92. The rotation of the first sun gear 90 and the second sun gear 92 drives the planet gears 94a, 94b. As the flange 70 is coupled to the planet gears 94a, 94b and the primary flight control surface 14, the movement of the planet gears 94a, 94b by the first sun gear 90 and the second sun gear 92 moves the flange 70, and thus, the primary flight control surface 14 to the desired position. Thus, in this example, the single rotary output to the primary flight control surface 14 is equal to a velocity sum of the first motor 60 and the second motor 62. The first motor 60 and the second motor 62 generally cooperate to rotate the primary flight control surface 14 relative to the aircraft 10 (FIG. 1).

In addition, in certain instances, the controller 74, 150 may output one or more control signals to one of the first motor 60 or the second motor 62 to rotate the first sun gear 90 or the second sun gear 92 in a first direction, and the controller 74, 150 may output one or more control signals to the other one of the first motor 60 and the second motor 62 to rotate the respective one of the first sun gear 90 or the second sun gear 92 in a second direction different than the first direction in instances where the first motor position sensor 72a or the second motor position sensor 72b indicate an unexpected position for the output shaft 60a, 62a of one of the first motor 60 or the second motor 62. Thus, in certain instances, the controller 74, 150 may control the first motor 60 and the second motor 62 to rotate the first sun gear 90 and the second sun gear 92, respectively, in the same direction or in opposing directions, as needed to produce the desired rotary output for moving the primary flight control surface 14 to the flight control surface position. Thus, the use of the first motor 60 and the second motor 62 along with the differential gear set 68 ensures the proper operation of the primary flight control surface 14 in instances where the first motor 60 or the second motor 62 is not operating properly. Accordingly, the actuator system 16 may be considered a fail-passive actuator system for use with a vehicle, such as the aircraft 10.

Figure 7:
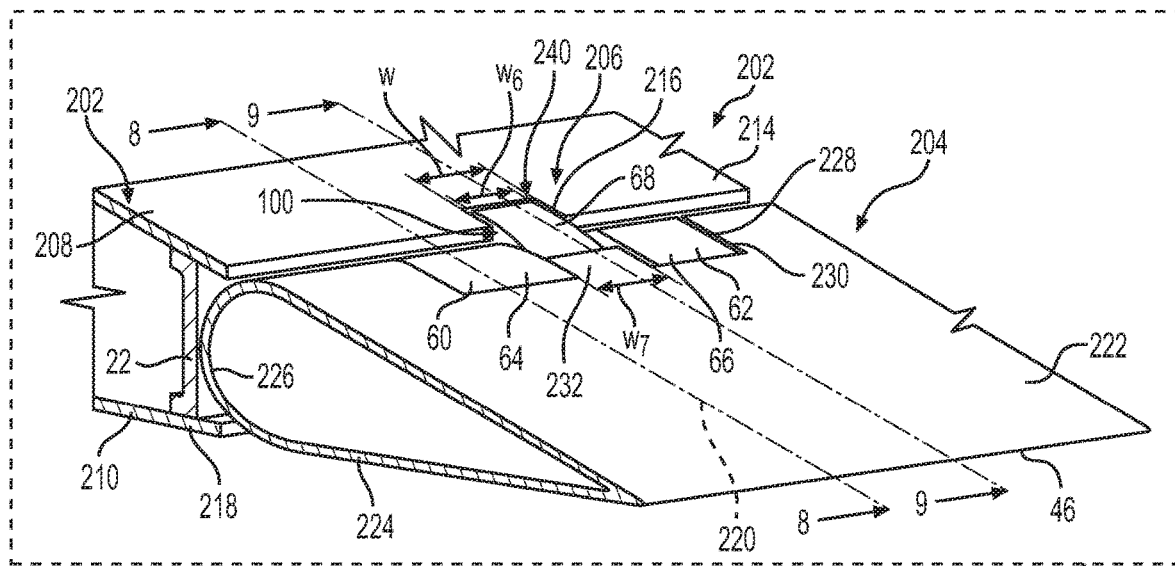
FIG. 7 is a detail schematic illustration of a portion of an aerial vehicle, such as an aircraft, which includes an actuator system for a flight control surface in accordance with one of various embodiments.

It should be noted that in other embodiments, the actuator system 16 may be configured differently to move or rotate the primary flight control surface 14 relative to the frame 12. For example, with reference to FIG. 7, a detail view of a portion of an aerial vehicle, such as an aircraft 200 is shown. In this example, the aircraft 200 is a fixed-wing aircraft. The aircraft 200 includes a support structure or frame 202 and a primary flight control surface 204. An actuator system 206 is coupled to the frame 202 and the primary flight control surface 204 to move or rotate the primary flight control surface 204 relative to the frame 202. As the frame 202, the primary flight control surface 204 and the actuator system 206 include components that are the same or similar to components of the frame 12, primary flight control surface 14 and the actuator system 16 discussed with regard to FIGS. 1-6B, the same reference numerals will be used to denote the same or similar components.

In one example, the primary flight control surface 204 an aileron, however, the actuator system 206 may be used to move or rotate a rudder, elevator, etc. In addition, the actuator system 206 may be used in conjunction with another actuator system to move or rotate a flap. Moreover, while a single actuator system 206 is shown herein for use with the primary flight control surface 204, any number of actuator systems 206 may be employed depending on the length of the primary flight control surface, for example. In this example, the actuator system 206 is configured to move the primary flight control surface 204 between about positive 90 degrees to about negative 90 degrees relative to the frame 202 about an axis of rotation R5 (FIG. 8); however, the actuator system 206 may be configured to move the primary flight control surface 204 about any desired range of motion that is typical for the particular primary flight control surface. For example, in certain embodiments, the actuator system 206 may be configured to move the primary flight control surface 204 between about positive 30 degrees and about negative 30 degrees in the instance where the primary flight control surface 204 provides an attitude adjustment for the aircraft 10.

Figure 8:
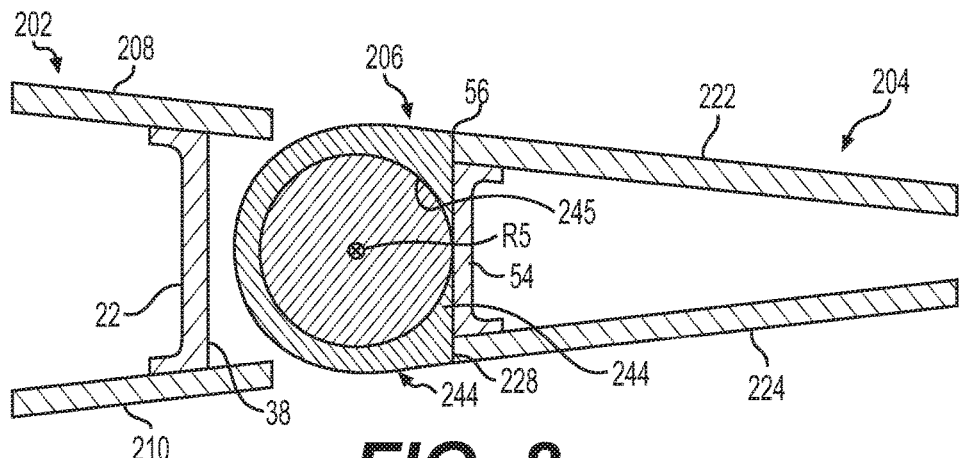
FIG. 8 is a cross-sectional view of the portion of the aerial vehicle, taken along line 8-8, of FIG. 7.

In this example, the frame 202 includes a first frame member 208, a second frame member 210 and the connecting frame member 22. In one example, the frame 202 is a wing beam. The first frame member 208 is generally opposite the second frame member 210, and is spaced apart from the first frame member 208 by the connecting frame member 22. The first frame member 208 has a first end 214, which is adjacent to the primary flight control surface 204. In this example, the first end 214 defines a slot 216. The slot 216 receives a portion of the actuator system 206 for coupling the primary flight control surface 204 to the actuator system 206. The second frame member 210 has a second end 218, which is adjacent to the primary flight control surface 204. The second end 218 defines a second slot 220. The second slot 220 receives a portion of the actuator system 206 for coupling the primary flight control surface 204 to the actuator system 206. Generally, the second end 218 has the same shape as the first end 214 to facilitate the coupling of the primary flight control surface 204 to the actuator system 206. The connecting frame member 22 is coupled between the first frame member 208 and the second frame member 210, and the first frame member 208, the second frame member 210 and the connecting frame member 22 cooperate to define the cavity 38 (FIG. 8). The cavity 38 is sized to cooperate with a portion of the actuator system 206.

In one example, the primary flight control surface 204 includes a first control surface 222, a second control surface 224, a first control end 226 and the second control end 46. The first control surface 222 is opposite the second control surface 224. The first control end 226 and the second control end 46 interconnect the first control surface 222 and the second control surface 224. The first control surface 222 may be tapered from the first control end 226 to the second control end 46, and the second control surface 224 may be substantially planar from the first control end 226 to the second control end 46. In this example, the first control end 226 defines a recess 228 that extends from the first control surface 222 to the second control surface 224 (FIG. 8). The recess 228 is sized to receive the actuator system 206. In one example, the recess 228 includes an enlarged opening 230 and a tab 232. The enlarged opening 230 enables the actuator system 16 to be coupled to the primary flight control surface 204. The tab 232 enables the primary flight control surface 204 to move relative to the frame 202. With reference to FIG. 8, the primary flight control surface 204 may also include the interconnecting member 54. In one example, the actuator system 206 may be coupled to the interconnecting member 54 to couple the actuator system 206 to the primary flight control surface 204. The second cavity 56 is defined by the first control surface 222, the second control surface 224 and the interconnecting member 54.

The actuator system 206 movably or rotatably couples the primary flight control surface 204 to the frame 202. In one example, the actuator system 206 includes the first motor 60, the second motor 62, the first speed reduction gear set 64, the second speed reduction gear set 66, the differential gear set 68, a flange 240, the one or more sensors 72 (FIG. 3) and the controller 74 (FIG. 3). Generally, in this example, the first motor 60, the second motor 62, the first speed reduction gear set 64, the second speed reduction gear set 66 and the differential gear set 68 are contained wholly within the cavity 38 and the second cavity 56. In addition, at least the first motor 60, the second motor 62, the first speed reduction gear set 64 and the second speed reduction gear set 66 are coupled to the primary flight control surface 204 so as to be coaxial with the axis of rotation R5 (FIG. 8).

In this example, the first motor 60 and the second motor 62 comprise electric servomotors, which are operable to drive the first speed reduction gear set 64 and the second speed reduction gear set 66, respectively. It should be noted that in certain instances, the first motor 60 and/or the second motor 62 may directly drive the differential gear set 68, if desired. With reference to FIG. 8, in one example, the first motor 60 and the second motor 62 are each coupled to the primary flight control surface 204 by a mounting bracket 242. The mounting bracket 242 may be composed of a metal, metal alloy or composite, and may be stamped, cast, machined, forged, additive manufactured, etc. In this example, the mounting bracket 242 includes a mounting end 244 and defines a mounting bore 245. The mounting end 244 is coupled to the interconnecting member 54. Generally, the mounting end 244 are fixedly coupled to the interconnecting member 54 via welding, mechanical fasteners, rivets, etc. The mounting bore 245 is coupled to the respective one of the first motor 60 or the second motor 62. In one example, the mounting bore 245 is coupled to the first motor 60 or the second motor 62 via welding, mechanical fasteners, rivets, press-fit, etc. The mounting bore 245 is generally removably coupled to the respective one of the first motor 60 and the second motor 62 to enable the repair or replacement of the respective one of the first motor 60 and the second motor 62, if needed. It should be noted that the mounting bracket 242 may be shaped similar to the mounting bracket 76, if desired, for coupling the first motor 60 and the second motor 62 to the primary flight control surface 204. Thus, each of the mounting brackets 242 cooperate to couple the respective one of the first motor 60 and the second motor 62 to the primary flight control surface 204.

Figure 9:
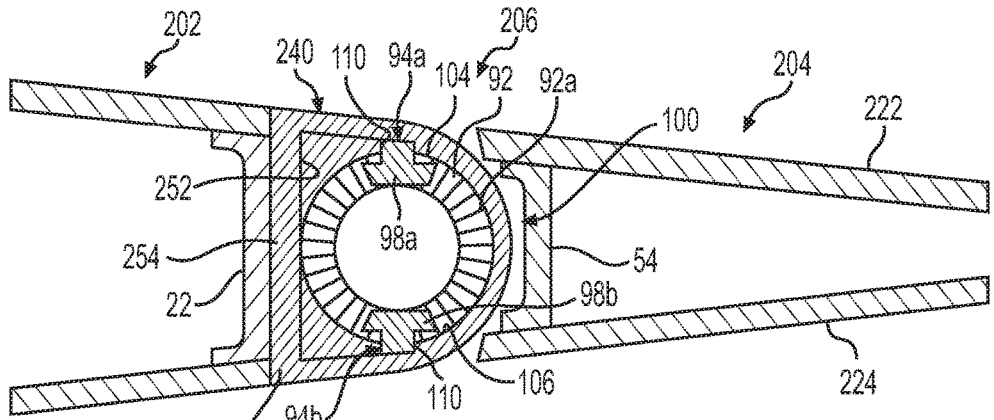
FIG. 9 is a cross-sectional view of the portion of the aerial vehicle, taken along line 9-9, of FIG. 7.

The first speed reduction gear set 64 is driven by the output shaft 60a of the first motor 60, and the second speed reduction gear set 66 is driven by the output shaft 62a of the second motor 62. The first speed reduction gear set 64 and the second speed reduction gear set 66 are each coupled to the differential gear set 68. Generally, the differential gear set 68 is coupled to the first speed reduction gear set 64 and the second speed reduction gear set 66 such that the differential gear set 68 is disposed within the slot 216 and the second slot 220 of the frame 202 to enable the differential gear set 68 to move freely relative to the frame 202. With reference to FIG. 9, the differential gear set 68 is driven by the first speed reduction gear set 64 and the second speed reduction gear set 66 to move or rotate the primary flight control surface 204. In one example, the differential gear set 68 includes the first sun gear 90 (FIG. 4), the second sun gear 92 and the planet gears 94a, 94b. The first sun gear 90 is coupled to the first speed reduction gear set 64, and the second sun gear 92 is coupled to the second speed reduction gear set 66. The coupling post 98a, 98b couples the respective one of the planet gears 94a, 94b to the flange 240.

The flange 240 couples the primary flight control surface 204 to the differential gear set 68. While discussed herein with regard to the actuator system 206, the flange 240 may be considered part of the frame 202 such that the planet gears 94a, 94b are directly coupled to the frame 202. In one example, the flange 240 includes the coupling portion 100 and a base 250. The flange 240 may be composed of a metal, metal alloy or composite, and may be stamped, cast, machined, forged, additive manufactured, etc. The coupling portion 100 is substantially U-shaped, and is sized to be positioned about the planet gears 94a, 94b. In one example, with brief reference to FIG. 7, the coupling portion 100 has a width W, which is about equal to or slightly less than a width W6 of the slot 216 and second slot 220. The width W is about equal to or slightly less than a width W7 of the tab 232 of the primary flight control surface 204. The slight difference in the widths W, W6, W7 enables the primary flight control surface 204 to move or rotate relative to the frame 202 without contacting the frame 202. With reference back to FIG. 9, the first side 104 and the second side 106 each define the post receptacle 110 on an interior surface 104a, 106a. The post receptacle 110 is sized and shaped to receive the coupling post 98a, 98b of the respective one of the planet gears 94a, 94b. The post receptacle 110 is defined in the coupling portion 100 so as to be proximate or adjacent to the curved sidewall 108.

The base 250 is coupled to the coupling portion 100 and to the connecting frame member 22. In one example, the base 250 is coupled the first side 104 and the second side 106 of the coupling portion 100 via any suitable technique, including, but not limited to welding, mechanical fasteners, adhesives, etc. The base 250 includes a first base side 252 opposite a second base side 254. The first base side 252 faces the planet gears 94a, 94b, and the second base side 254 is coupled to the connecting frame member 22. The second base side 254 is coupled to the connecting frame member 22 via any suitable technique, including, but not limited to welding, mechanical fasteners, adhesives, etc. The base 250 is coupled to the connecting frame member 22. Thus, the primary flight control surface 204, via the connection between the flange 240 and the connecting frame member 22, is directly coupled to the differential gear set 68, while the first motor 60 and the second motor 62 are directly coupled to the primary flight control surface 204.

As the control of the actuator system 206 is the same as the actuator system 16, the control system associated with the actuator system 206 will be described briefly herein. As discussed with regard to FIGS. 1-6B, the one or more sensors 72 observe one or more conditions associated with the actuator system 206 and transmit sensor signals to the controller 74, 150 and/or the remote controller 120 associated with the aircraft 10 (FIG. 3). The controller 74, 150 is in communication with the first motor 60, the second motor 62 and the sensors 72 over a suitable communication architecture that facilitates the transfer of power, data and commands, such as a bus. The controller 74, 150 may also be in communication with the remote controller 120 associated with the aircraft 10 (FIG. 1) or the first motor 60, the second motor 62 and the sensors 72 may be in communication with the remote controller 120 or a controller associated with the aircraft 10 that is positioned remotely from the actuator system 16. In this example, as discussed with regard to FIGS. 1-6B, the controller 74, 150 is responsive to the flight surface position 119 received as input from the remote controller 120 and the sensor signals from the sensors 72 to output one or more control signals 121a, 121b to the first motor 60 and the second motor 62, respectively, to rotate the output shafts 60a, 62a to move the primary flight control surface 14 to the flight surface position 119 received from the remote controller 120.

As the assembly and use of the actuator system 206 to move the primary flight control surface 204 relative to the frame 202 is substantially the same as the assembly and use of the actuator system 16 to move the primary flight control surface 14 relative to the frame 12, the assembly and use of the actuator system 206 will not be discussed in detail herein. Briefly, however, in one example, with reference to FIG. 8, in order to assemble the actuator system 206, with the mounting brackets 242 formed, the mounting brackets 242 are coupled to the interconnecting member 54 so as to be on opposed sides of the tab 232. With the actuator system 206 assembled and the flange 240 formed, the flange 240 is coupled to the planet gears 94a, 94b such that the coupling posts 98a, 98b are received within each of the post receptacles 110. The actuator system 206 is coupled to the primary flight control surface 204, and the first motor 60 and the second motor 62 are each coupled to the respective one of the mounting brackets 242. With reference to FIG. 9, the base 250 of the flange 240 is coupled to the connecting frame member 22 of the frame 202 to couple the actuator system 206 to the frame 202.

Upon receipt of the flight surface position 119, the controller 74, 150 outputs one or more control signals 121a, 121b to the first motor 60 and the second motor 62, respectively, to rotate the output shafts 60a, 62a. The rotation of the output shaft 60a drives the first speed reduction gear set 64, which drives the first sun gear 90. The rotation of the output shaft 62a drives the second speed reduction gear set 66, which drives the second sun gear 92. As the flange 240 is coupled to the planet gears 94a, 94b and the frame 202, the movement of the first sun gear 90 and the second sun gear 92 moves the primary flight control surface 204 to the desired position as the frame 202 is fixed. Thus, in this example, the single rotary output is equal to a velocity sum of the first motor 60 and the second motor 62. The first motor 60 and the second motor 62 generally cooperate to rotate the primary flight control surface 204 relative to the aircraft 10 (FIG. 1).

Thus, the actuator system 16, 206 directly drives the primary flight control surface 14, 204, and in this example, the planet gears 94a, 94b each directly drive the primary flight control surface 14, 204. The controller 74, 150 of the actuator system 16, 206 may control the first motor 60 and the second motor 62 to rotate the first sun gear 90 and the second sun gear 92, respectively, in the same direction or in opposing directions, as needed to produce the desired rotary output for moving the primary flight control surface 14, 204 to the desired flight control surface position. Thus, in certain instances, the first electric servomotor rotates the first sun gear in a first direction, the second electric servomotor rotates the second sun gear in a second direction, and the first direction is different than the second direction. The use of the first motor 60 and the second motor 62 along with the differential gear set 68 ensures the proper operation of the primary flight control surface 14, 204 in instances where the first motor 60 or the second motor 62 is not operating properly. Accordingly, the actuator system 16, 206 may be considered a fail-passive actuator system for use with a vehicle, such as the aircraft 10.

Moreover, the first motor 60 and the second motor 62 provide two load paths, which reduces jamming of one of the first motor 60 and the second motor 62. In this regard, the use of the first motor 60 and the second motor 62 ensures that the motion of the primary flight control surface 14, 204 may be controlled in the instance where one of the first motor 60, the second motor 62, the first speed reduction gear set 64 or the second speed reduction gear set 66 has jammed or is not operating properly. For example, a jam may be detected based on the sensor signals from the first motor position sensor 72*a* or the second motor position sensor 72*b*. By mounting the planet gears 94*a*, 94*b* so that the planet gears 94*a*, 94*b* may move freely about the axis of rotation R, R5, in the instance of a single point jam in the actuator system 16, 206, the controller 74, 150 may cease supplying power to the first motor 60 and the second motor 62, and the primary flight control surface 14, 204 may back-drive the load path to a point where a jam did not occur. The use of the actuator system 16, 206 also reduces a weight of the aircraft 10, 200 as the actuator system 16, 206 eliminates the need for hydraulic pumps or other hydraulic system components onboard the aircraft 10, 200. Further, the actuator system 16, 206 is less complex and reduces maintenance time compared to a hydraulic system.

It should be noted that while the controller 74, 150 is described and illustrated herein as receiving a position for the primary flight control surface 14, the controller 74, 150 may be responsive to other inputs for controlling the actuator system 16, 206 to move the primary flight control surface 14. For example, the controller 74, 150 may be responsive to an input that provides a rate of movement for the primary flight control surface 14, an amount of force generated by the primary flight control surface 14, etc. Generally, the position of the primary flight control surface 14, the rate of movement of the primary flight control surface 14 and the amount of force generated by the primary flight control surface 14 that may each be received as input to the controller 74, 150 may be considered a demand for the primary flight control surface 14, and the controller 74, 150 may output the one or more control signals 121*a*, 121*b* to the first motor 60 and the second motor 62, respectively, based on the demand that is received as input.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An actuator system for a flight control surface of an aerial vehicle, comprising:
   a differential gear set having a first sun gear, a second sun gear and at least one planet gear to directly drive the flight control surface, the flight control surface has an axis of rotations;
   a first electric servomotor coupled to the aerial vehicle, and the first electric servomotor drives the first sun gear to drive the at least one planet gear; and
   a second electric servomotor coupled to the aerial vehicle, the second electric servomotor drives the second sun gear to drive the at least one planet gear such that the first electric servomotor and the second electric servomotor cooperate to rotate the flight control surface relative to the aerial vehicle by producing a single rotary output, and the first electric servomotor and the second electric servomotor are coupled to the aerial vehicle so as to be coaxial with the axis of rotation.

2. The actuator system of claim 1, further comprising:
   a first speed reduction gear set driven by the first electric servomotor and the first speed reduction gear set drives the first sun gear; and
   a second speed reduction gear set driven by the second electric servomotor and the second speed reduction gear set drives the second sun gear.

3. The actuator system of claim 1, wherein the first electric servomotor and the second electric servomotor rotate in the same direction to drive the first sun gear and the second sun gear, respectively, to drive the at least one planet gear.

4. The actuator system of claim 1, wherein the single rotary output is equal to a velocity sum of the first electric servomotor and the second electric servomotor.

5. The actuator system of claim 1, wherein the first sun gear and the second sun gear are coupled to the first electric servomotor and the second electric servomotor, respectively, so as to be coaxial with the axis of rotation, and the at least one planet gear has a second axis of rotation that is transverse to the axis of rotation of the flight control surface.

6. The actuator system of claim 1, wherein the aerial vehicle includes a frame and the first electric servomotor and the second electric servomotor are coupled to the frame by respective mounting brackets, and the first electric servomotor and the second electric servomotor are spaced apart along a longitudinal axis defined by the actuator system.

7. The actuator system of claim 6, further comprising a flange coupled to the flight control surface, the flange including at least one receptacle for receiving a portion of the at least one planet gear to couple the at least one planet gear to the flight control surface.

8. The actuator system of claim 7, wherein the frame of the aerial vehicle defines a cavity, and at least the first electric servomotor and the second electric servomotor are received within the cavity.

9. An aircraft, comprising:
   a flight control surface having an axis of rotation;

an actuator system for moving the flight control surface relative to the aircraft, the actuator system including:
- a differential gear set having a first sun gear, a second sun gear and at least one planet gear to drive the flight control surface;
- a first motor coaxial with the axis of rotation, the first motor drives the first sun gear to drive the at least one planet gear; and
- a second motor coaxial with the axis of rotation, the second motor drives the second sun gear to drive the at least one planet gear such that the first motor and the second motor cooperate to rotate the flight control surface relative to the aircraft.

10. The aircraft of claim 9, wherein the actuator system further comprises:
- a first speed reduction gear set driven by the first motor and the first speed reduction gear set drives the first sun gear; and
- a second speed reduction gear set driven by the second motor and the second speed reduction gear set drives the second sun gear.

11. The aircraft of claim 10, wherein the first motor and the second motor rotate in the same direction to drive the first sun gear and the second sun gear, respectively, to drive the at least one planet gear.

12. The aircraft of claim 9, wherein the first sun gear and the second sun gear are coupled to the first motor and the second motor, respectively, so as to be coaxial with the axis of rotation, and the at least one planet gear has a second axis of rotation that is transverse to the axis of rotation of the flight control surface.

13. The aircraft of claim 9, wherein the aircraft includes a frame, each of the first motor and the second motor are coupled to the frame by a mounting bracket, and the first motor and the second motor are spaced apart along a longitudinal axis defined by the actuator system.

14. The aircraft of claim 13, further comprising a flange coupled to the flight control surface, the flange including at least one receptacle for receiving a portion of the at least one planet gear to couple the at least one planet gear to the flight control surface.

15. The aircraft of claim 13, wherein the frame defines a cavity, and at least the first motor and the second motor are received within the cavity.

16. An aircraft, comprising:
- a flight control surface having an axis of rotation;
- an actuator system for moving the flight control surface relative to the aircraft, the aircraft includes a frame and a flange coupled to the frame, the flange including at least one receptacle, the actuator system including:
  - a differential gear set having a first sun gear, a second sun gear and at least one planet gear;
  - a first motor coaxial with the axis of rotation, the first motor drives the first sun gear; and
  - a second motor coaxial with the axis of rotation, the second motor drives the second sun gear such that the first motor and the second motor cooperate to rotate the flight control surface relative to the aircraft, with a portion of the at least one planet gear received in the at least one receptacle to couple the at least one planet gear to the frame.

17. The aircraft of claim 16, wherein the flight control surface includes a first control surface coupled to a second control surface with an interconnecting member to define a cavity, at least the first motor and the second motor are received within the cavity and the first motor and the second motor are each coupled to the interconnecting member with a mounting bracket.

* * * * *